(12) United States Patent
Lilleberg et al.

(10) Patent No.: US 9,490,940 B2
(45) Date of Patent: Nov. 8, 2016

(54) METHOD AND APPARATUS FOR PROVIDING TRANSMISSION RELAY USING SOFT SYMBOL ESTIMATION

(75) Inventors: Jorma Lilleberg, Oulu (FI); Ting Zhou, Shanghai (CN); Fang Wang, Jiangsu (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 1667 days.

(21) Appl. No.: 12/918,996

(22) PCT Filed: Feb. 21, 2008

(86) PCT No.: PCT/IB2008/000390
§ 371 (c)(1),
(2), (4) Date: Nov. 9, 2010

(87) PCT Pub. No.: WO2009/104039
PCT Pub. Date: Aug. 27, 2009

(65) Prior Publication Data
US 2011/0044379 A1 Feb. 24, 2011

(51) Int. Cl.
*H04B 3/36* (2006.01)
*H04L 1/18* (2006.01)
*H04B 7/155* (2006.01)
*H04L 1/00* (2006.01)

(52) U.S. Cl.
CPC ......... *H04L 1/1845* (2013.01); *H04B 7/15592* (2013.01); *H04L 1/0055* (2013.01); *H04L 1/1812* (2013.01); *H04L 2001/0097* (2013.01)

(58) Field of Classification Search
USPC .................................................. 375/211, 214
See application file for complete search history.

(56) References Cited

U.S. PATENT DOCUMENTS

2010/0284448 A1* 11/2010 Miyoshi et al. .............. 375/214

OTHER PUBLICATIONS

International Search Report and Written Opinion of the International Searching Authority from corresponding Patent Cooperation Treaty Application No. PCT/IB2008/000390, dated Apr. 23, 2009, 20 pages.
Invitation to Pay Additional Fees and Where Applicable Protest Fee from corresponding Patent Cooperation Treaty Application No. PCT/IB2008/000390, dated Feb. 4, 2009, 6 pages.
IEEE802.16j, "IEEE Standard for Local and metropolitan area networks Part 16: Air Interface for Broadband Wireless Access Systems Amendment 1: Multihop Relay Specification", Jun. 12, 2009.
Li et al., "Distributed Turbo Coding with Soft Information Relaying in Multihop Relay Networks", IEEE Journal on Selected Areas in Communications, vol. 24, No. 11, pp. 2040-2050.
Bao et al, "Efficient Message Relaying for Wireless User Cooperation: Decode-Amplify-Forward (DAF) and Hybrid DAF and Coded-Cooperation", IEEE Transactions on Wireless Communications, vol. 6, No. 11, Nov. 1, 2007, pp. 3975-3984.

(Continued)

*Primary Examiner* — Kevin Kim
(74) *Attorney, Agent, or Firm* — Squire Patton Boggs (US) LLP

(57) ABSTRACT

An approach is provided for relaying signals. A signal is received over a communication link and demodulated. Soft symbols are estimated based on probability information corresponding to the demodulated signal. The demodulated signal is remodulated based on the soft symbols. A relay signal is output based on the remodulated signal.

18 Claims, 18 Drawing Sheets

(56) References Cited

OTHER PUBLICATIONS

Gomadam et al., "Optimal relay functionality for SNR maximization in memoryless relay networks", IEEE Journal on Selected Areas in Communications, vol. 25, No. 2, Feb. 1, 2007, pp. 390-401.

Schein et al., "The Gaussian parallel relay network," in Proc of ISIT 2000, Jun. 25, 2000, p. 22.

Hasna et al., "End-to-end performance of transmission systems with relays over Rayleigh-fading channels," IEEE Trans Wireless Commun., vol. 2, Nov. 2003, pp. 1126-1131.

Gastpar et al., "On the capacity of wireles networks: The relay case," in Proc of INFOCOM, 2002, pp. 1577-1586.

Sendonaris et al., "User cooperation diversity—Part I: System description," IEEE Trans. Commun., vol. 51, Nov. 2003, pp. 1927-1938.

Sendonaris et al., "User cooperation diversity—Part II: Implementation aspects and performance analysis," IEEE Trans. Commun., vol. 51, Nov. 2003, pp. 1939-1948.

Laneman et al., "Distributed space-time-coded protocols for exploiting cooperative diversity in wireless networks," IEEE Trans. on Inform. Theory, vol. 49, Oct. 2003, pp. 2415-2425.

* cited by examiner

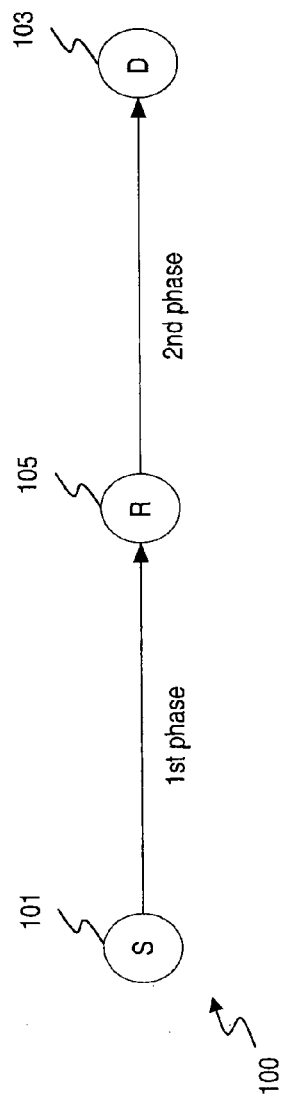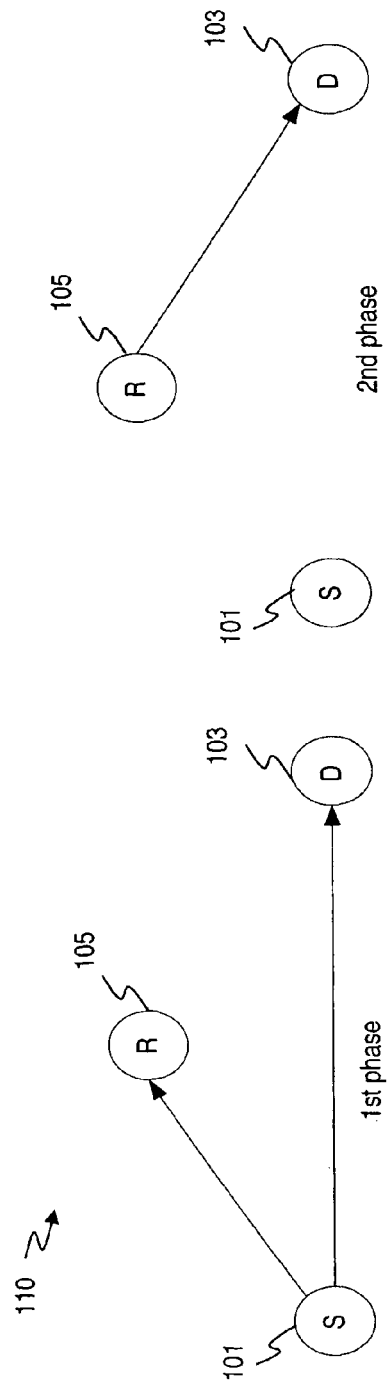
FIG. 1A
FIG. 1B

US 9,490,940 B2

METHOD AND APPARATUS FOR PROVIDING TRANSMISSION RELAY USING SOFT SYMBOL ESTIMATION

RELATED APPLICATION

This application was originally filed as PCT Application No. PCT/IB2008/000390 filed Feb. 21, 2008.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves relaying data transmissions in a manner that ensures accuracy and efficient use of network resources. Relays are needed within a network to extend coverage and/or to preserve signal integrity.

SOME EXEMPLARY EMBODIMENTS

Therefore, there is a need for an approach for accurately relaying signals, while minimizing use of network resources, such as bandwidth.

According to one embodiment of the invention, a method comprises receiving a signal over a communication link and demodulating the signal. The method also comprises estimating soft symbols based on probability information corresponding to the demodulated signal. Further, the method comprises remodulating the demodulated signal based on the soft symbols, and outputting a relay signal based on the remodulated signal.

According to another embodiment of the invention, an apparatus comprises a demodulator configured to demodulate a signal received over a communication link. The apparatus also comprises a soft symbol estimator configured to estimate soft symbols based on probability information corresponding to the demodulated signal. The apparatus further comprises a re-modulator configured to remodulate the demodulated signal based on the soft symbols as a relay signal.

According to yet another embodiment of the invention, a system comprises a relay node configured to receive a signal over a communication link, to demodulate the signal, and to estimate soft symbols based on probability information corresponding to the demodulated signal. The relay node is further configured to remodulate the demodulated signal based on the soft symbols as a relay signal.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 1A and 1B are diagrams of a non-cooperative relay system and a cooperative relay system, respectively, according to various exemplary embodiments of the invention;

DESCRIPTION OF PREFERRED EMBODIMENTS

Figure 2A:
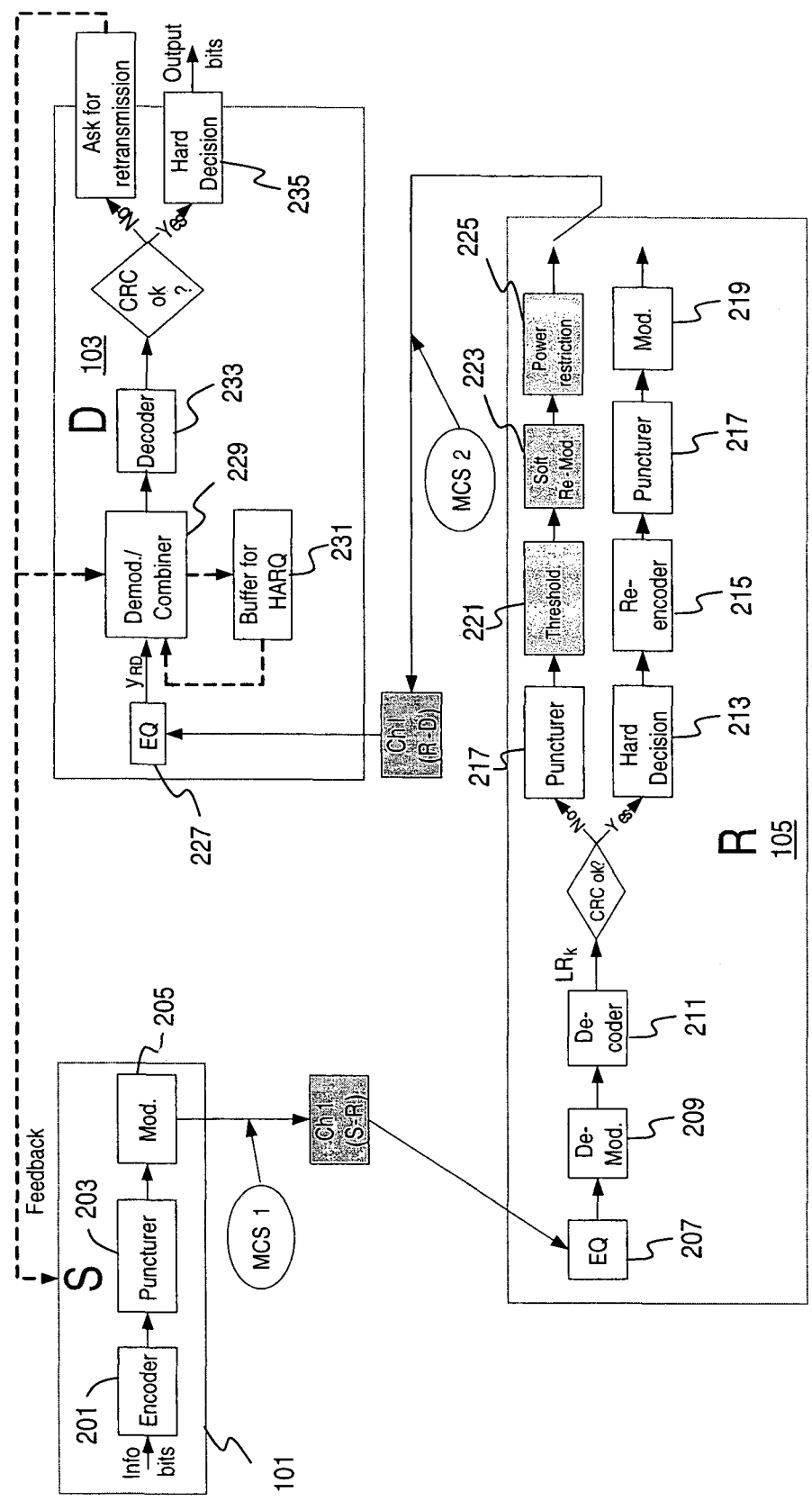
FIGS. 2A and 2B are diagrams of the components of the non-cooperative relay system and the cooperative relay system of FIGS. 1A and 2B, respectively, according to various exemplary embodiments of the invention.

An apparatus, method, and software for relaying using soft symbol estimation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture, it is recognized by one of ordinary skill in the art that the embodiments of the inventions have applicability to any type of communication system and equivalent functional capabilities.

FIGS. 1A and 1B are diagrams of a non-cooperative relay system and a cooperative relay system, respectively, according to various exemplary embodiments of the invention. A relayed transmission system provides transmission of signals from one terminal to another through a number of relays without using larger power at the transmitter. To improve the performance of a relayed transmission, cooperative schemes between terminals and relay nodes are employed: (1) relay technology for coverage extension (as shown in FIG. 1A), and (2) relay technology for throughput enhancement (as shown in FIG. 1B).

Under the first scenario, the relay system 100 is referred to as a non-cooperative relay system, while the second scenario is a cooperative relay system 110. As seen in FIG. 1A, the non-cooperative relay system 100 includes a source node 101 that generates a signal to a destination node 103 via a relay node 105, which regenerates the transmitted signal to reach the destination node 103. In this example, the first phase involves transmission of the signal to the relay node 105, and then forwarded by the relay node 105 to the destination node 103 in the second phase.

As for the cooperative relay system 110, in the first phase, a source node 101 transmits a signal to both a relay node 105 and a destination node 103. The second phase involves the relay node 105 subsequently transmitting the received signal from the source node 101 to the destination node 103. By receiving the signal from two entities (e.g., nodes 101, 105), the destination node 103 experiences increased throughput.

Two forwarding techniques are employed by the relay nodes 105, 109: Amplify and Forward (AF), and Decode (or Demodulate) and Forward (DF). In the Amplify and Forward (AF) scheme, the relay node 105 simply amplifies the source's signal and forwards the amplified signal to the destination 103. In decode and forward (DF), this approach involves demodulating, decoding, re-encoding, re-modulating and forwarding the re-generated signal to the destination. Alternatively, a simplified form of DF operation, denoted demodulate and forward (DF), does not perform decoding, but demodulates and re-modulates the signal. As used herein, the term "DF" refers to either decode and forward, or demodulate and forward. Also, "static" DF refers to a relay node always forward received signals to the destination irrespective of whether the signal can be decoded correctly or not.

These relay systems 100, 110 are further detailed below in FIGS. 2A and 2B.

Figure 2B:
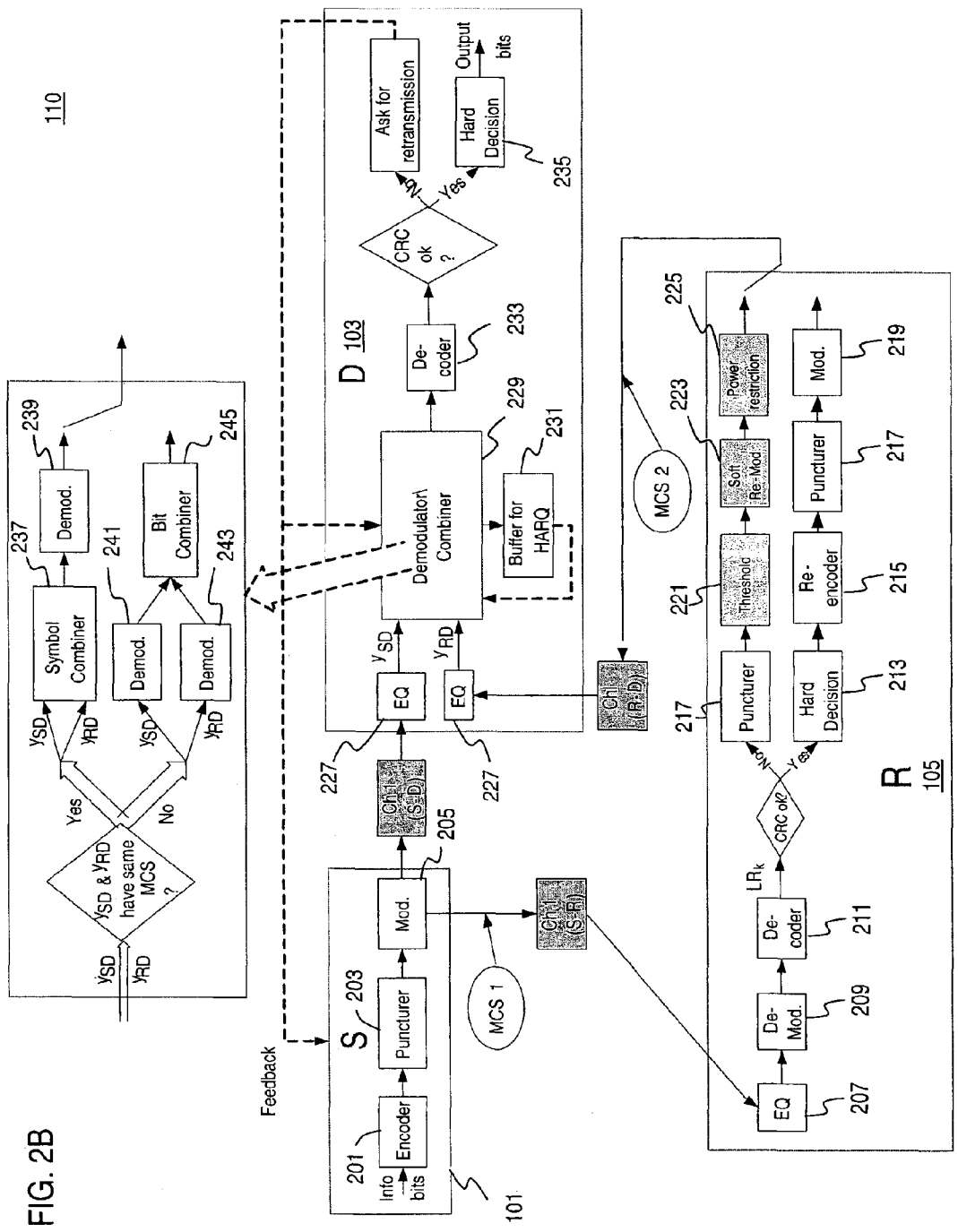

FIGS. 2A and 2B are diagrams of the components of the non-cooperative relay system and the cooperative relay system of FIGS. 1A and 2B, respectively, according to various exemplary embodiments of the invention. As seen in FIG. 2A, the source node 101 includes an encoder 201 that receives information bits and outputs codes, which are then punctured using a puncturer 203. Thereafter, the encoded signal is modulated by a modulator 205 for transmission to the destination node 103 by way of the relay node 105. Upon receiving the signal from the source node 101, the relay node 105, in this example, provides equalization using an equalizer 207, which then feeds the equalized signal to a demodulator 209. The demodulated signal can then be decoded using a decoder 211. At this point, the relay node 105 determines whether there are any errors in the received signal by using, e.g., cyclic redundancy check (CRC).

If the CRC is valid, then hard decisions can be made by hard decision logic 213. Re-encoding is performed by re-encoder 215. The encoded signals are then punctured by puncturer 217, and subsequently modulated by modulator 219.

However, if the CRC results in an error, the signal is simply punctured by the puncturer 217. It is noted that although puncturers 217 are shown as two separate entities, the puncturers 217 can be the same component. Thresholding logic 221 is then applied to the punctured codes, and fed to a soft re-modulator 223. Subsequently, a power restriction module 225 ensures the signal does not exhibit a power level beyond a certain (configurable) level.

The relay node 105 can then forward the signal to the destination node 103. At the destination 103, equalization is applied using equalizer 227. A demodulator/combiner 229 operates in conjunction with a buffer 231 to provide an input signal to a decoder 233. Per FIG. 2A, the buffer 231 stores transmissions associated with a Hybrid Automatic Repeat Request (HARQ) procedure. In an exemplary embodiment, HARQ is deployed between the source node 101 and the destination 103.

One aspect of the 3GPP LTE system 100 is that an error control scheme referred to as Hybrid Automatic Repeat Request (HARQ) is utilized. The HARQ scheme basically combines ARQ protocols with forward-error-correction (FEC) schemes, to provide an error-control technique for wireless links. It is noted that different wireless technologies may utilize different HARQ schemes. HARQ can be used to increase the link and spectral efficiency of LTE, as HARQ allows the system 100, 110 to operate at a relative high block error rate of the first transmissions. The HARQ scheme can be made part of the medium access control (MAC) layer and be enabled on a terminal by terminal basis.

The destination node 103 determines whether the decoded signal passes the CRC check; if so, a hard decision logic 235 outputs the bits corresponding to the received signal. Otherwise, the destination node 103 requests retransmission.

As for the cooperative relay system 110, a key difference is that the destination node 103 receives signals, $y_{SD}$ and $y_{RD}$, respectively, from both the source node 101 and the relay node 105 for processing by the demodulator/combiner 229. At this stage, the destination node 103 determines whether the signals employ the same modulation and coding schemes. If the identical schemes are utilized, then the symbols are combined (using a symbol combiner 237) and demodulated (via demodulator 239). However, if different modulation and coding schemes are used, then separate demodulators 241, 243 are used, wherein the bits associated with the demodulated signals are bit combined by bit combiner 245.

Further details of the above system 100, 110 are now provided. For explanatory purposes, the following notational conventions are utilized. Bold lowercase letters denote vectors, e.g., x. It is assumed that all vectors are row-vectors, but can be transposed into column vectors, e.g., $x^T$. Vector elements are plain lowercase letters with subscripts beginning at zeros, e.g., $x=\{x_0, x_1, \ldots x_{M-1}\}$. Also, the function $P_A(a)$ represents the probability of event $A=a$.

Because the non-cooperative relay system 110 is essentially a derivative of the cooperative relay system 100, only the model for the cooperative relay system 100 is explained; as the non-cooperative relay system 110 can be specialized in a straight forward manner.

In the first phase (as shown in the cooperative relay system 110 of FIG. 1B), a vector of message bits $u=\{u_0, u_1, \ldots, u_{K-1}\}$ in the source node 101 is passed through the encoder 201 (e.g., binary encoder) to produce a codeword $b=\{b_0, b_1, \ldots, b_{N-1}\}$. The codeword is then grouped and passed through an m-ordered modulator 205 (i.e., every m coded bits correspond to one symbol) to produce a vector of transmitted symbols $$s = \{s_0, s_1, \ldots, s_{\frac{N}{m}-1}\}.$$

$b^k=\{b_0^k, b_1^k, \ldots, b_{m-1}^k\}$ denotes the m code bits corresponding to symbol $s_k$. The source node 101 broadcasts s to both the relay 105 and destination 103.

Assuming the channel coefficient is fixed during a transmission block, the received signals at relay $y_{sr}$ and destination $y_{sd}$ are:

$$y_{sr,k} = h_{sr}s_k + n_{sr,k} \quad (1)$$

$$y_{sd,k} = h_{sd}s_k + n_{sd,k} \quad (2)$$

where $h_{sr}$ and $h_{sd}$ are the fading coefficients between source and relay and between source and destination, respectively. $n_{sr,k}$ and $n_{sd,k}$ are zero mean complex Gaussian white noises with variances $\sigma_{sr}^2$ and $\sigma_{sd}^2$, respectively.

According to one embodiment, the relay node 105 employs a static DF technique. The relay node 105 demodulates or decodes the received signal, but does not perform hard decisions. Instead, the relay node 105 uses the demodulated/decoded soft information to re-modulate to soft symbol and transmits such information in the second phase, which is denoted as $x_{r,k}$. The relay node 105 can employ the same modulation mode as the source node 101 or a different modulation mode according to, for example, the channel quality—i.e., AMC in the relay node 105.

In the second phase, the signal received by destination can be written as:

$$y_{rd,k} = h_{rd}x_{r,k} + n_{rd,k} \quad (3)$$

where $h_{rd}$ is the fading coefficients between relay and destination and $n_{rd,k}$ is a zero mean complex Gaussian white noises with variances $\sigma_{rd}^2$.

Destination combines the two versions of source signal $y_{sd}$ and $y_{rd}$ to decode and obtain the information.

In non-cooperative relay system 101, the $y_{sd}$ is ignored.

Under one conventional approach, the relay system 110 utilizes a soft information forwarding scheme for distributed turbo coding. The system 110 provides a Soft-in-Soft-out (SISO) convolution re-encoder, and a soft symbol calculation in the relay node 105. With respect to the soft symbol calculation, by using the a posteriori probability (APP) of a coded bit, which is from either a SISO decoder or a SISO re-encoder, the relay node 105 can calculate the soft symbol corresponding to binary phase shift keying (BPSK) (e.g., the binary bit 0 is mapped into 1 and 1 is mapped into −1) in the following form:

$$\tilde{s}_k = P_{s|y_{sr}}(s_k=0|y_{sr}) \times 1 + P_{s|y_{sr}}(s_k=1|y_{sr}) \times (-1) \quad (4)$$

An equivalent noise model for the soft estimates is as follows:

$$\tilde{s}_k = s_k(1-\tilde{n}_k) \quad (5)$$

where $s_k$ is the exact transmitted symbol in source and $\tilde{n}_k$ is the equivalent noise, with the mean and variance estimated as follows:

$$\mu_n = \frac{1}{l}\sum_{k=1}^{l}|\tilde{s}_k - s_k| \quad (6)$$

$$\sigma_n^2 = \frac{1}{l}\sum_{k=1}^{l}(1 - \tilde{s}_k s_k - \mu_n) \quad (7)$$

Further, assuming the power restriction of relay is $P_2$, then relay transmits the following signal: $x_{r,k} = \beta\tilde{s}_k$, where $$\beta = \sqrt{\frac{P_2}{E[|\tilde{s}_k|^2]}}.$$

The described conventional approach has a number of drawbacks. First, when estimating the mean and variance of the equivalent noise $\tilde{n}_k$, $s_k$ is the exact transmitted symbol in the source 101, which is not practical because the relay node 105 is not notified. Secondly, such an arrangement does not address higher order modulation, and thus does not support adaptive modulation and coding (AMC) in relay nodes, thereby reducing the efficiency of the system. Moreover, the performance of the soft modulation is poor.

It is recognized that the DF lacks the advantages of AF and vice versa: DF regenerates the signal and supports AMC in the relay nodes. However, if imperfect decoding occurs in the relay process, DF can loses information by incorrectly performing hard decision, which causes error propagation in the re-encoding. However, AF does not lose information or cause error propagation; this technique, unfortunately, amplifies noise as well as the signal and does not support AMC, which is significant to improving system throughput.

A dynamic DF relay technique overcomes the drawback of the original (or "static") DF technique by performing a cyclic redundancy check (CRC) after decoding. If CRC implies proper decoding, then the relay node will forward the signal to the destination node. Otherwise, the relay node will not forward the signal, but provide the appropriate feedback to the source node and wait for retransmission. Such dynamic DF technique can avoid error propagation while still exhibiting the advantages of the original DF.

The drawback, however, is that the relay node is required to use a relatively complex protocol, thereby causing some difficulty in resource allocation and interference management (e.g., within the base station (BS)). Notably, in a centralized scheduling system in which the BS has the responsibility for resource allocation, any transmission or retransmission requests as sent to the BS for granting of resources. Under this scenario, bandwidth can be wasted when the relay node decodes erroneously, and has to request retransmission from the source node instead of forwarding data to the destination; that is, the resource having been already allocated by the BS to the link from the relay node to the destination is wasted. Furthermore, the retransmission request has to be sent to the BS, which may introduce greater latency.

Figure 3:
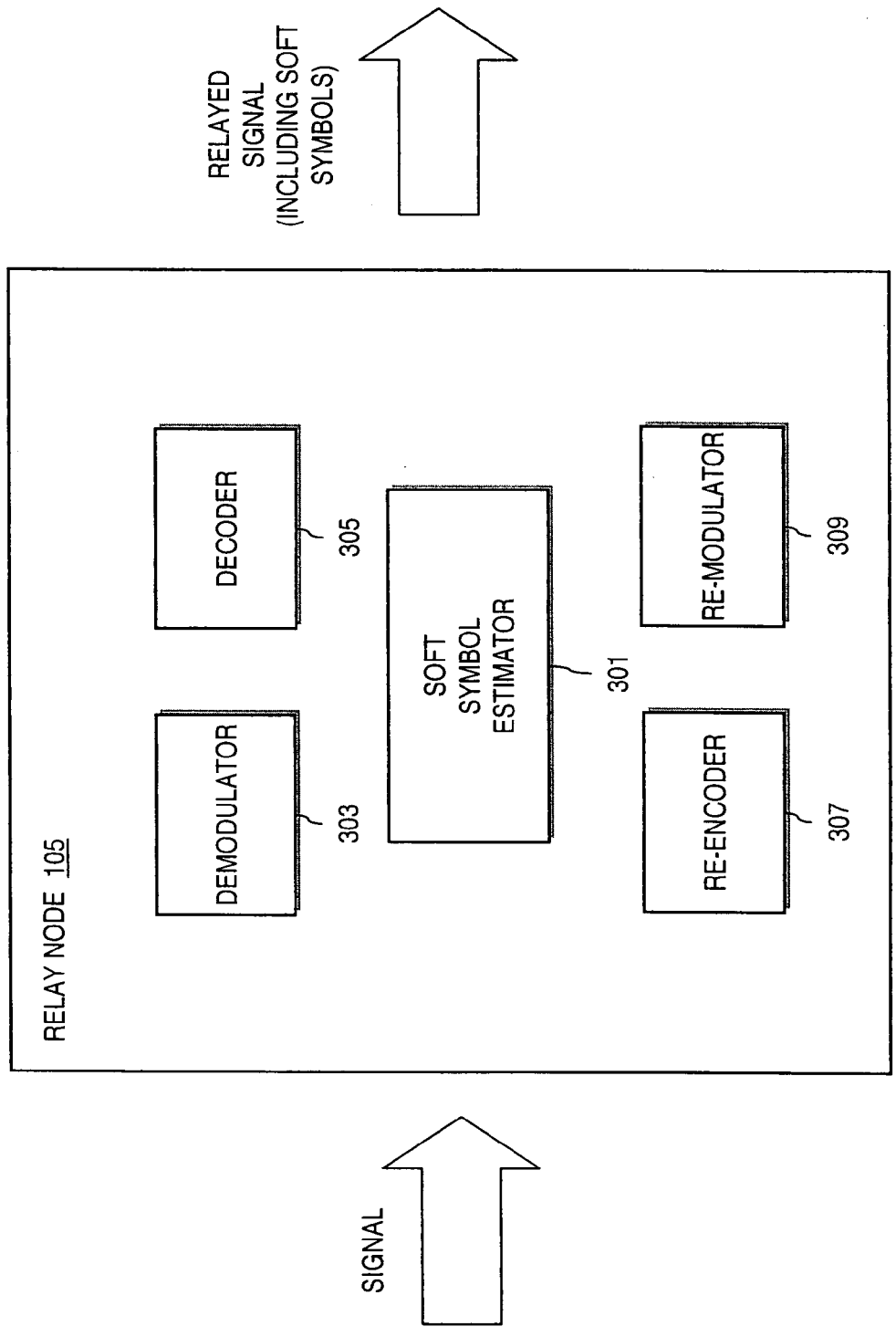
FIG. 3 is a diagram of a relay node capable of providing soft symbol estimation, according to an exemplary embodiment.

In view of the above drawbacks, a soft symbol estimation scheme is provided in the Decode/Demodulate and Forward (DF) relay technique to improve performance, as explained with respect to FIG. 3.

FIG. 3 is a diagram of a relay node capable of providing soft symbol estimation, according to an exemplary embodiment. A relay node 105 can be deployed in either of the systems 100, 110 in FIG. 1. The relay node 105 provides a soft symbol estimator 301 to enhance the traditional DF scheme. Also, the relay node 105 includes a demodulator 303 as well as an optional decoder 305 (which is utilized in a decode and forward technique). A re-encoder 307 is provided, if the decoder 305 exists. Further, the relay node 105 has a re-modulator 309.

This arrangement, according to various embodiments, combines the main advantages of both AF and DF to optimize the performance of relay technology with minimum cost.

Figure 4:
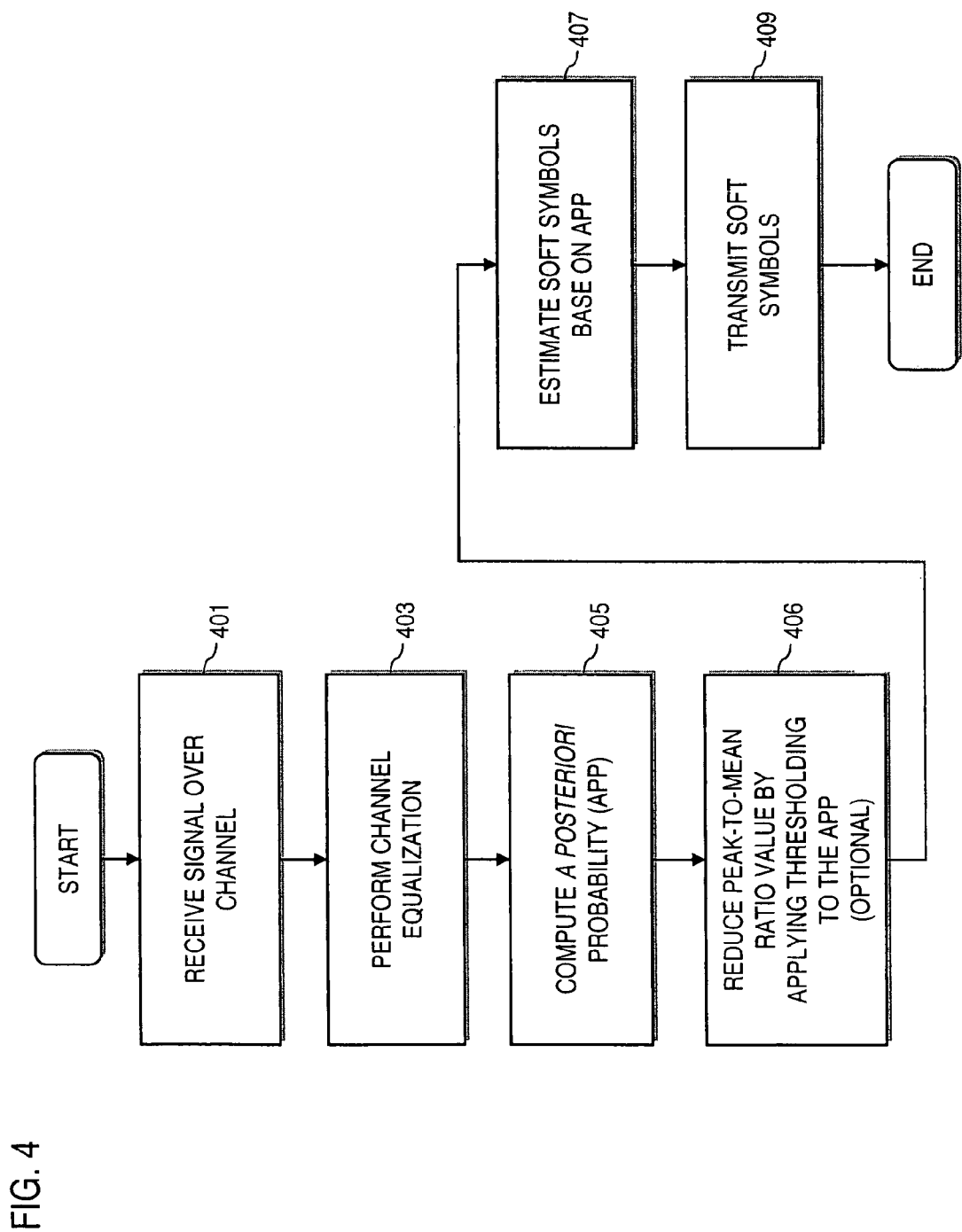
FIG. 4 is a flowchart of a relay process utilizing soft symbol estimation, in accordance with an embodiment of the invention.

FIG. 4 is a flowchart of a relay process utilizing soft symbol estimation, in accordance with an embodiment of the invention. This process is a soft symbol estimation scheme, which can be employed in a Decode/Demodulate and Forward (DF) relay technique to improve the performance in both scenarios of relay systems 100, 110. According to certain embodiments, the soft symbol estimation scheme provides both the advantages of AF and DF techniques, and can provide a general approach for any modulation scheme (and can further support relay AMC).

In step 401, the relay node 105 receives a signal from the source node 101. It is assumed that the relay node 105 knows the exact channel coefficient of link SR. When receiving $y_{sr}$, the relay node 105 first performs channel equalization (step 403):

$$z_k = \frac{y_{sr,k}}{h_{sr}} = s_k + \frac{n_{sr,k}}{h_{sr}} \quad (8)$$

where $$\frac{n_{sr,k}}{h_{sr}}$$

is the equivalent zeros mean complex Gaussian white noise with equivalent variance $$\sigma_{sr,E}^2 = \frac{\sigma_{sr}^2}{\|h_{sr}\|^2}.$$

z is then passed through demodulator 303, decoder (e.g., SISO) 305 and re-encoder (e.g., SISO) 307. Thereafter, the 'a posteriori probability (APP)' of coded bits $P_{b_i^k|z}(b_i^k=q|z)$ is computed, as in step 405, from demodulator 303, SISO decoder 305 or SISO re-encoder 307. Next, the probability information can be put through a predetermined threshold before performing the soft estimation—e.g., APP values that are larger than the threshold are set as the threshold value to reduce peak-to-mean ratio value (as in step 406). The APPs of code bits are used to estimate the soft symbols $\hat{s}_k$, which are to be transmitted by the relay node 105 (per steps 407 and 409).

The soft symbol estimation process is explained as follows. First, the relationship between APP of code bits and APP of the corresponding symbols is expressed as:

$$P_{b_i^k|z}(b_i^k = q \mid z) = \sum_{\substack{x \in S \\ b_i^k(x)=q}} P_{s_k|z}(s_k = x \mid z), \quad (9)$$

where S is the candidate constellation set of symbol $s_k$, $b_i^k(x)=q$ denotes $s_k$ takes the constellation point x whose corresponding $b_i^k$ equals q, i=0, 1, . . . , m−1 and m refers to the modulation order.

Applying Byers expression and assuming the transmitted symbol is uniformly distributed, the following is obtained:

$$\begin{aligned} P_{s_k|z}(s_k = x \mid z) &= \frac{P_{z_k|s_k}(z_k \mid s_k = x) P_{s_k}(s_k = x)}{P_z(z)} \\ &= \frac{P_{z_k|s_k}(z_k \mid s_k = x) P_{s_k}(s_k = x)}{\sum_{a \in S} P_{z_k|s_k}(z_k \mid s_k = a) P_{s_k}(s_k = a)} \\ &= \frac{P_{z_k|s_k}(z_k \mid s_k = x)}{\sum_{a \in S} P_{z_k|s_k}(z_k \mid s_k = a)} \\ &= \frac{\exp\left(-\frac{(z_{k,R} - x_R)^2 + (z_{k,I} - x_I)^2}{2\sigma_{sr,E}^2}\right)}{\sum_{a \in S} \exp\left(-\frac{(z_{k,R} - a_R)^2 + (z_{k,I} - a_I)^2}{2\sigma_{sr,E}^2}\right)} \\ &= \frac{1}{C} \exp\left(-\frac{(z_{k,R} - x_R)^2 + (z_{k,I} - x_I)^2}{2\sigma_{sr,E}^2}\right), \end{aligned} \quad (10)$$

where $$C = \sum_{a \in S} \exp\left(-\frac{(z_{k,R} - a_R)^2 + (z_{k,I} - a_I)^2}{2\sigma_{sr,E}^2}\right)$$

is a constant over a symbol, $(\bullet)_R$ and $(\bullet)_I$ refers to the real part and imaginary part of $(\bullet)$, respectively.

From (9) and (10), this yields the following:

$$\begin{aligned} P_{b_i^k|z}(b_i^k = q \mid z) &= \sum_{\substack{x \in S \\ b_i^k(x)=q}} P_{s_k|z}(s_k = x \mid z) \\ &= \frac{1}{C} \sum_{\substack{x \in S \\ b_i^k(x)=q}} \exp\left(-\frac{(z_{k,R} - x_R)^2 + (z_{k,I} - x_I)^2}{2\sigma_{sr,E}^2}\right) \\ &= \frac{\sum_{\substack{x \in S \\ b_i^k(x)=q}} \exp\left(-\frac{(z_{k,R} - x_R)^2 + (z_{k,I} - x_I)^2}{2\sigma_{sr,E}^2}\right)}{\sum_{a \in S} \exp\left(-\frac{(z_{k,R} - a_R)^2 + (z_{k,I} - a_I)^2}{2\sigma_{sr,E}^2}\right)} \end{aligned} \quad (11)$$

where $b^k = \{b_0^k, b_1^k, \ldots, b_{m-1}^k\}$ denotes the m code bits corresponding to symbol $s_k$.

Assuming the modulation order is m and the code bits $b_i^k \in GF(r)$, m×r equations are obtained from (11) for each symbol. Since there is only one unknown variable $z_k$ in each equation, it is easy to solve the equations and get different candidates from different equations $\{z_k^0, z_k^1, \ldots, z_k^M \ldots\}$. It is noted that various methods, according to certain embodiments, can be applied to combine these candidates to obtain the corresponding soft symbol estimate:

$$\tilde{s}_k = F(z_k^0, z_k^1, \ldots, z_k^M \ldots) \quad (12)$$

According to the above principle, one approach is as follows. If a binary encoder is applied, then $$\frac{P_{b^k|z}(b_i^k = 1 \mid z)}{P_{b^k|z}(b_i^k = 0 \mid z)} = \frac{\sum_{\substack{x \in S \\ b_i^k(x)=1}} \exp\left(-\frac{(z_{k,R} - x_R)^2 + (z_{k,I} - x_I)^2}{2\sigma_{sr,E}^2}\right)}{\sum_{\substack{x \in S \\ b_i^k(x)=0}} \exp\left(-\frac{(z_{k,R} - x_R)^2 + (z_{k,I} - x_I)^2}{2\sigma_{sr,E}^2}\right)} \quad (13)$$

where k=0, 1, . . . , m−1, m refers to the modulation order.

The soft symbol $\tilde{s}_k$ can be readily computed as follows:

$$\tilde{s}_k = \underset{z}{\operatorname{argmin}} \sum_{i=0}^{m-1} \alpha_i \left| LR_i - \frac{\sum_{\substack{x \in S \\ b_i^k(x)=1}} f(z, x)}{\sum_{\substack{x \in S \\ b_i^k(x)=0}} f(z, x)} \right|^p, \quad (14)$$

where $$LR_i = \frac{P_{b^k|z}(b_i^k = 1 \mid z)}{P_{b^k|z}(b_i^k = 0 \mid z)}, \quad f(z, x) = \exp\left(-\frac{(z_R - x_R)^2 + (z_I - x_I)^2}{2\sigma_{sr,E}^2}\right).$$

$\alpha_i$ is the weight factor of each code bit $b_i^k$ corresponding to the soft symbol $\tilde{z}_k$, and p is the power index of the absolute error. $\alpha_i$ and p are parameters that depend on which criteria are employed to solve (14). For example, if the code bits have the same reliability and MMSE criteria is employed, then $\alpha_i = 1$ and p=2.

From equation (14), the soft symbol can be estimated for any modulation according to the mapping pattern. According to certain embodiments, the following modulation schemes are described: BPSK, QPSK, and 16QAM. With BPSK, if the binary bit 0 is mapped into 1 and 1 is mapped into −1, then the soft symbol estimation is:

$$\tilde{s}_k = -\frac{1}{2} \cdot \ln\left(\frac{P_{b^k|z}(b^k = 1 \mid z)}{P_{b^k|z}(b^k = 0 \mid z)}\right) \times \sigma_{sr,E}^2, \quad (15)$$

In the case of QPSK, if the binary sequence $b_0 b_1$ is mapped in the following pattern (as listed in Table 1):

TABLE 1

| 00 | 01 | 10 | 11 |
|---|---|---|---|
| $\frac{\sqrt{2}}{2}(1+j)$ | $\frac{\sqrt{2}}{2}(1-j)$ | $\frac{\sqrt{2}}{2}(-1+j)$ | $\frac{\sqrt{2}}{2}(-1-j)$ | then the soft symbol estimation is:

$$\tilde{s}_k = -\frac{\sqrt{2}}{2} \ln\left(\frac{P_{b^k|z}(b_0^k = 1 \mid z)}{P_{b^k|z}(b_0^k = 0 \mid z)}\right) \times \sigma_{sr,E}^2 - j \cdot \frac{\sqrt{2}}{2} \ln\left(\frac{P_{b^k|z}(b_1^k = 1 \mid z)}{P_{b^k|z}(b_1^k = 0 \mid z)}\right) \times \sigma_{sr,E}^2, \quad (16)$$

As for 16QAM, if the binary sequence $b_0 b_1 b_2 b_3$ is mapped in the following pattern:

TABLE 2

| 0000 | 0100 | 1000 | 1100 |
|---|---|---|---|
| $AM_1 + j \cdot AM_1$ | $AM_3 + j \cdot AM_1$ | $-AM_1 + j \cdot AM_1$ | $-AM_3 + j \cdot AM_1$ |
| 0001 | 0101 | 1001 | 1101 |
| $AM_1 + j \cdot AM_3$ | $AM_3 + j \cdot AM_3$ | $-AM_1 + j \cdot AM_3$ | $-AM_3 + j \cdot AM_3$ |
| 0010 | 0110 | 1010 | 1110 |
| $AM_1 - j \cdot AM_1$ | $AM_3 - j \cdot AM_1$ | $-AM_1 - j \cdot AM_1$ | $-AM_3 - j \cdot AM_1$ |
| 0011 | 0111 | 1011 | 1111 |
| $AM_1 - j \cdot AM_3$ | $AM_3 - j \cdot AM_3$ | $-AM_1 - j \cdot AM_3$ | $-AM_3 - j \cdot AM_3$, | where $AM_1 = 1/\sqrt{10}$ and $AM_3 = 3/\sqrt{10}$, then the soft symbol estimation for 16QAM is:

$$\tilde{s}_k = \underset{x}{\operatorname{argmin}} \left( \alpha_1 \left| \frac{P_{b^k|z}(b_0^k = 1 \mid z)}{P_{b^k|z}(b_0^k = 0 \mid z)} - g_1(x) \right|^p + \alpha_2 \left| \frac{P_{b^k|z}(b_1^k = 1 \mid z)}{P_{b^k|z}(b_1^k = 0 \mid z)} - g_2(x) \right|^p \right) + \quad (17)$$

$$j \cdot \underset{x}{\operatorname{argmin}} \left( \alpha_1 \left| \frac{P_{b^k|z}(b_2^k = 1 \mid z)}{P_{b^k|z}(b_2^k = 0 \mid z)} - g_1(x) \right|^p + \alpha_2 \left| \frac{P_{b^k|z}(b_3^k = 1 \mid z)}{P_{b^k|z}(b_3^k = 0 \mid z)} - g_2(x) \right|^p \right)$$

where $g_1(x) = \dfrac{\exp\left(-\frac{(x - AM_1)^2}{2\sigma_{sr,E}^2}\right) + \exp\left(-\frac{(x - AM_3)^2}{2\sigma_{sr,E}^2}\right)}{\exp\left(-\frac{(x + AM_1)^2}{2\sigma_{sr,E}^2}\right) + \exp\left(-\frac{(x + AM_3)^2}{2\sigma_{sr,E}^2}\right)}$ $g_2(x) = \dfrac{\exp\left(-\frac{(x - AM_1)^2}{2\sigma_{sr,E}^2}\right) + \exp\left(-\frac{(x + AM_1)^2}{2\sigma_{sr,E}^2}\right)}{\exp\left(-\frac{(x - AM_3)^2}{2\sigma_{sr,E}^2}\right) + \exp\left(-\frac{(x + AM_3)^2}{2\sigma_{sr,E}^2}\right)},$ In another approach (referred to as "LR Threshold"), the soft re-modulation function may result in a high peak-to-mean ratio problem since the output from demodulator 303 or SISO decoder 305 (or SISO re-encoder)

$$LR_i = \frac{P_{b^k|z}(b_i^k = 1 \mid z)}{P_{b^k|z}(b_i^k = 0 \mid z)}$$

varies in a large region.

Therefore, a threshold is employed on the output LRs before the soft symbol estimation function 301, such that values larger than the threshold are set as the value of threshold.

In another approach (denoted as "power restriction"), it is assumed that the power restriction of relay is $P_2$, whereby the relay node 105 transmits the following signal:

$$x_{r,k} = \beta \tilde{s}_k, \text{ where } \beta = \sqrt{\frac{P_2}{E[|\tilde{s}_k|^2]}} \quad (18)$$

In yet another approach ("destination operation"), according to the soft symbol estimate function 301, the transmitted signal from the relay node 105 can be expressed as:

$$x_{r,k} = \beta \tilde{s}_k = \beta \left( s_k + \frac{n_{sr,k}}{h_{sr}} \right).$$

The signal from the relay node 105 received by the destination node 103 is the following:

$$y_{rd,k} = h_{rd} x_{r,k} + n_{rd} \quad (19)$$

$$= h_{rd} \beta \left( s_k + \frac{n_{sr,k}}{h_{sr}} \right) + n_{rd} = h_{rd} \beta s_k + \left( h_{rd} \beta \frac{n_{sr,k}}{h_{sr}} + n_{rd} \right)$$

where the equivalent noise variance $\sigma_E^2 = \|h_{rd}\|^2 \beta^2 \sigma_{sr,E}^2 + \sigma_{rd}^2$.

In the cooperative relay system 110 (FIG. 2B), the destination node 103 combines the two versions $y_{rd}$ and $y_{sd}$ in symbol level if the same modulation is applied in both source and relay or in bit lever if different modulations are applied in source and relay.

In the non-cooperative relay system 100 (FIG. 2A), the destination node 103 only operates on $y_{rd}$.

Under another approach, a hybrid scheme can be employed to optimize the performance. There are two aspects to this approach. First involves the "hybrid" of the original modulation and the soft symbol estimation within the relay node 105. As such, the relay node 105 may calculate the CRC after decoding. If CRC implies correct, relay will perform the original modulation on the forwarding bits. Otherwise, the relay node 105 performs the soft symbol estimation on the forwarding bits.

The second aspect pertains to which part of the coded bits is to be forwarded in advance by the relay node 105. If the relay node 105 decodes correctly, the punctured parity bits forwarded first. Otherwise, the systematic bits are forwarded by the relay node 105 ahead of time.

The above arrangement, according to certain embodiments, exhibits enhance performance over traditional relay techniques, as shown in FIGS. 5-11.

Figure 5:
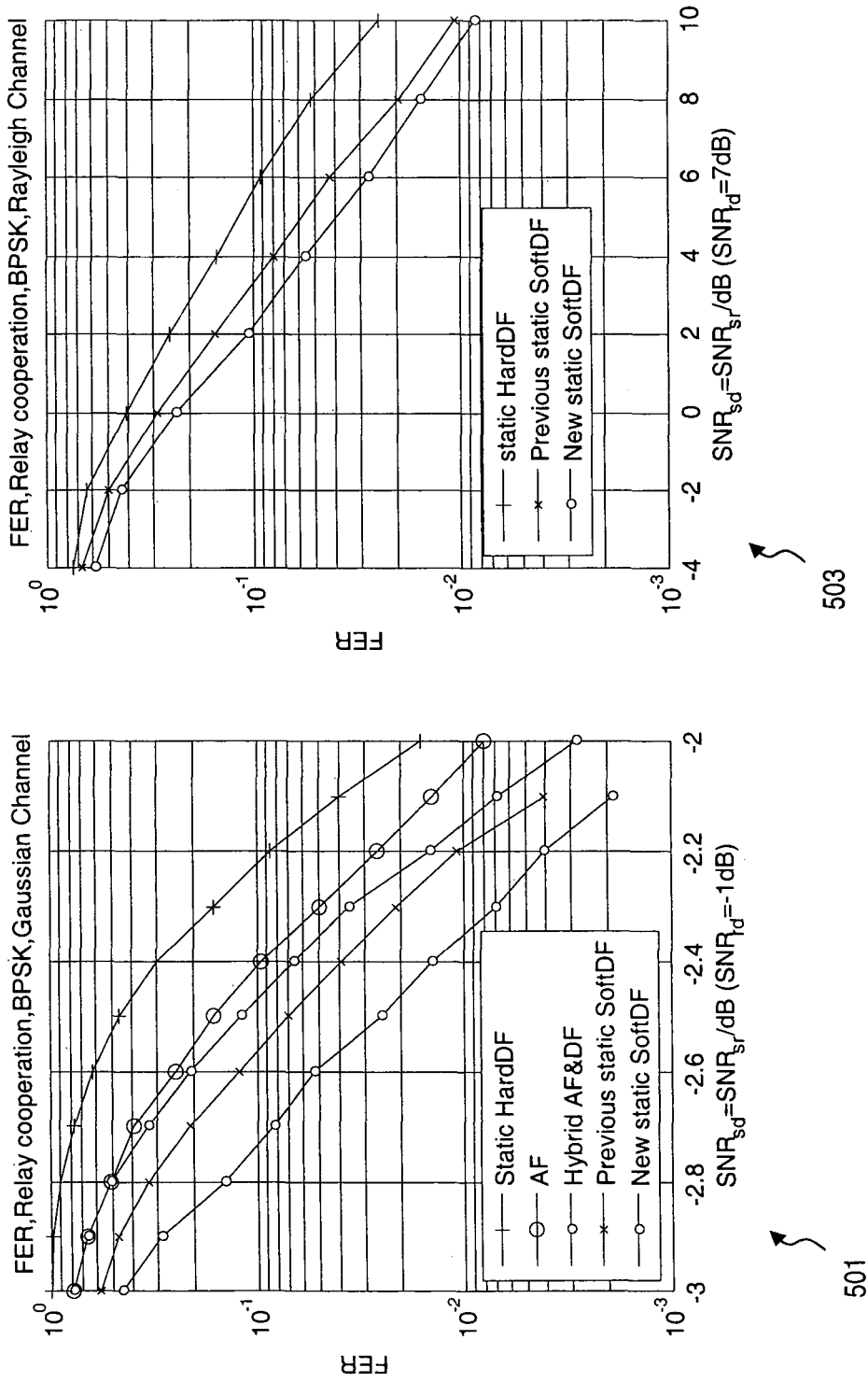
FIG. 5 is a diagram of graphs showing frame error rate (FER) performance comparison of various relay schemes involving binary phase shift keying (BPSK), in accordance with an embodiment of the invention.

FIG. 5 is a diagram of graphs showing frame error rate (FER) performance comparison of various relay schemes involving binary phase shift keying (BPSK), in accordance with an embodiment of the invention. For the purposes of illustration, the configuration involving static DF with original modulation is denoted "static Hard DF", while static DF with soft symbol estimation is referred to as "static Soft DF."

Performance of the static soft DF process of FIG. 4 are compared with a conventional soft information forwarding scheme, conventional AF, static Hard DF and dynamic DF scheme. In the simulations of FIGS. 5-11, the simulation parameters for a cooperative relay configuration are listed in Table 3.

TABLE 3

| | |
|---|---|
| Modulation | 1) Source: BPSK; Relay: BPSK |
| | 2) Source: QPSK; Relay: 16QAM |
| Channel S to D | 1) SNR_sr-SNR_sd = 0 |
| Channel S to R | 2) SNR_sr-SNR_sd = −3 dB |
| | 3) SNR_sr-SNR_sd = +3 dB |
| | 4) SNR_sr-SNR_sd = +6 dB |
| Channel R to D | SNR_sd is fixed and assumed to be quite good. |
| Channel model | 1) Gaussian channel |
| | 2) Rayleigh block fading channel |
| Code length (K) | 1000 |
| Channel coding | Source: |
| | (13, 11) ½ Turbo codes (puncturing half parity bits) |
| | Relay: |
| | 1) forward K systematic bits |
| | 2) forward K punctured parity bits |
| LR threshold | Exp$\hat{\ }$5 |
| HARQ | 1) No HARQ |
| | 2) IR HARQ, Maximum retransmission number = 1 |
| Soft symbol estimation parameter | $\alpha_i = 1$<br>p = 2 |

The simulation results for a cooperative relay system are illustrated in FIGS. 5-9.

As for a non-cooperative relay system, the following simulation parameters are provided in below in Table 4.

TABLE 4

| | |
|---|---|
| Modulation | Source: BPSK; Relay: BPSK |
| Channel model | Gaussian channel |
| Code length (K) | 1000 |
| Channel coding | Source: |
| | (13, 11) ½ Turbo codes (puncturing half parity bits) |
| | Relay: |
| | same code as source |
| LR threshold | Exp$\hat{\ }$5 |
| HARQ | IR |
| | Maximum retransmission number = 1 |
| Soft symbol estimation parameter | $\alpha_i = 1$<br>p = 2 |

Figure 10:
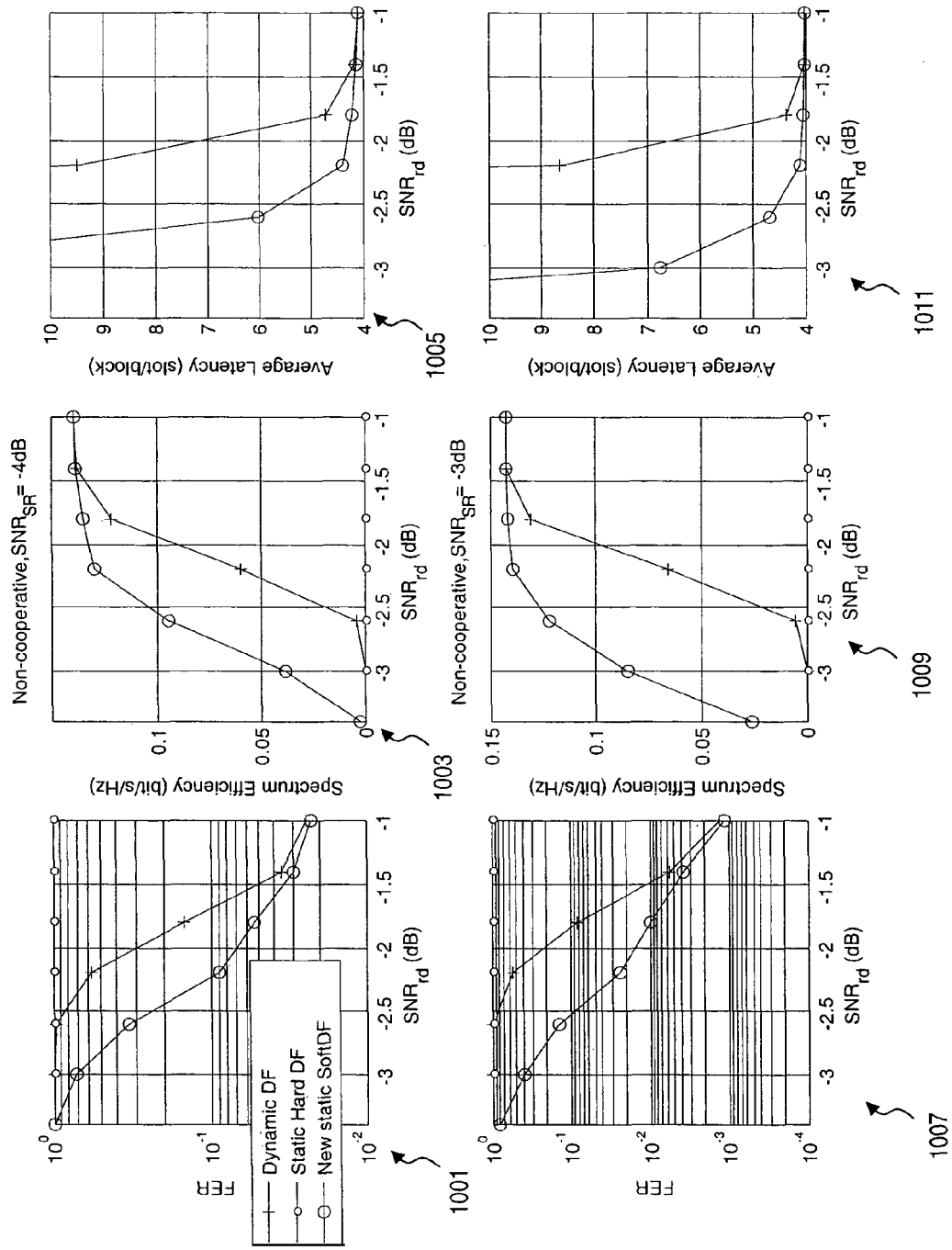
FIG. 10 is a diagram of graphs showing performance comparison of various relay schemes utilized in a non-cooperative relay system, in accordance with an embodiment of the invention.

The simulation result on non-cooperative relay system is illustrated in FIG. 10.

Figure 11:
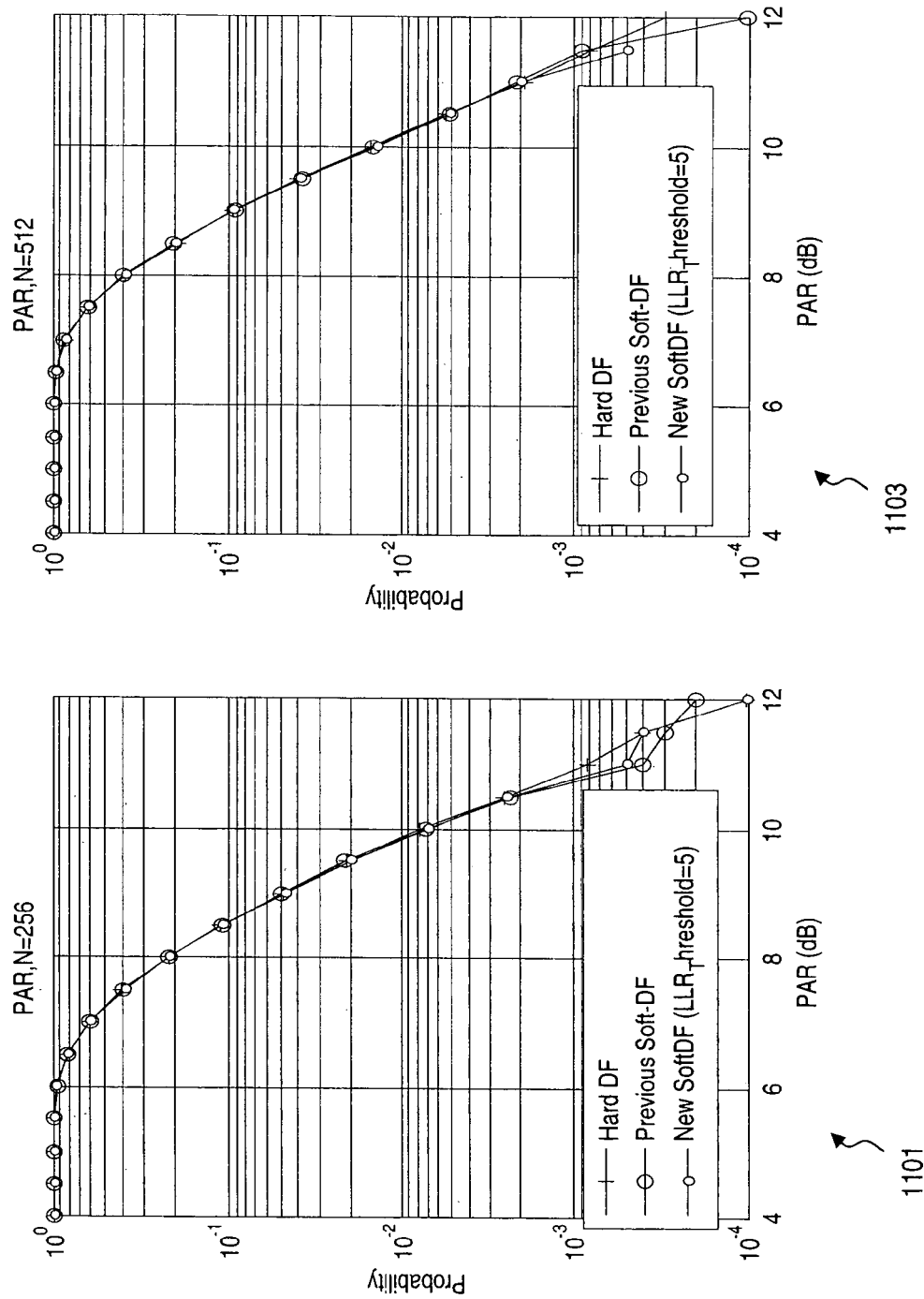
FIG. 11 is a diagram of graphs showing peak-to-average ratio (PAR) performance comparison of various relay schemes, in accordance with an embodiment of the invention.

Although the soft modulation approach, according to certain embodiments, can result in larger PAR than conventional modulation techniques, this concern is negligible if adopted in an OFDM system whose PAR is large (shown in FIG. 11).

FIG. 5 shows the simulation results of FER performance in different schemes, where BPSK is adopted in both the source node 101 and the relay node 105. It is noted that this particular simulation does not utilize HARQ. Graph 501 shows FER in an AWGN channel, while graph 503 shows performance in a Rayleigh block fading channel. In graph 501 (from the top down), the curves are static hard DF scheme, AF scheme, hybrid AF/DF scheme (i.e., if the relay node 105 decodes correctly, the node 105 operates in hard DF mode; otherwise, the node 105 operates in an AF mode.), a conventional soft DF, and the new soft DF scheme. As observed, the new scheme achieves significant gain compare to the other schemes. In graph 503, the result is similar to that of the AWGN channel case of graph 501; however, only the performance of static hard DF scheme, conventional soft DF scheme, and the new soft DF scheme is shown.

Figure 6:
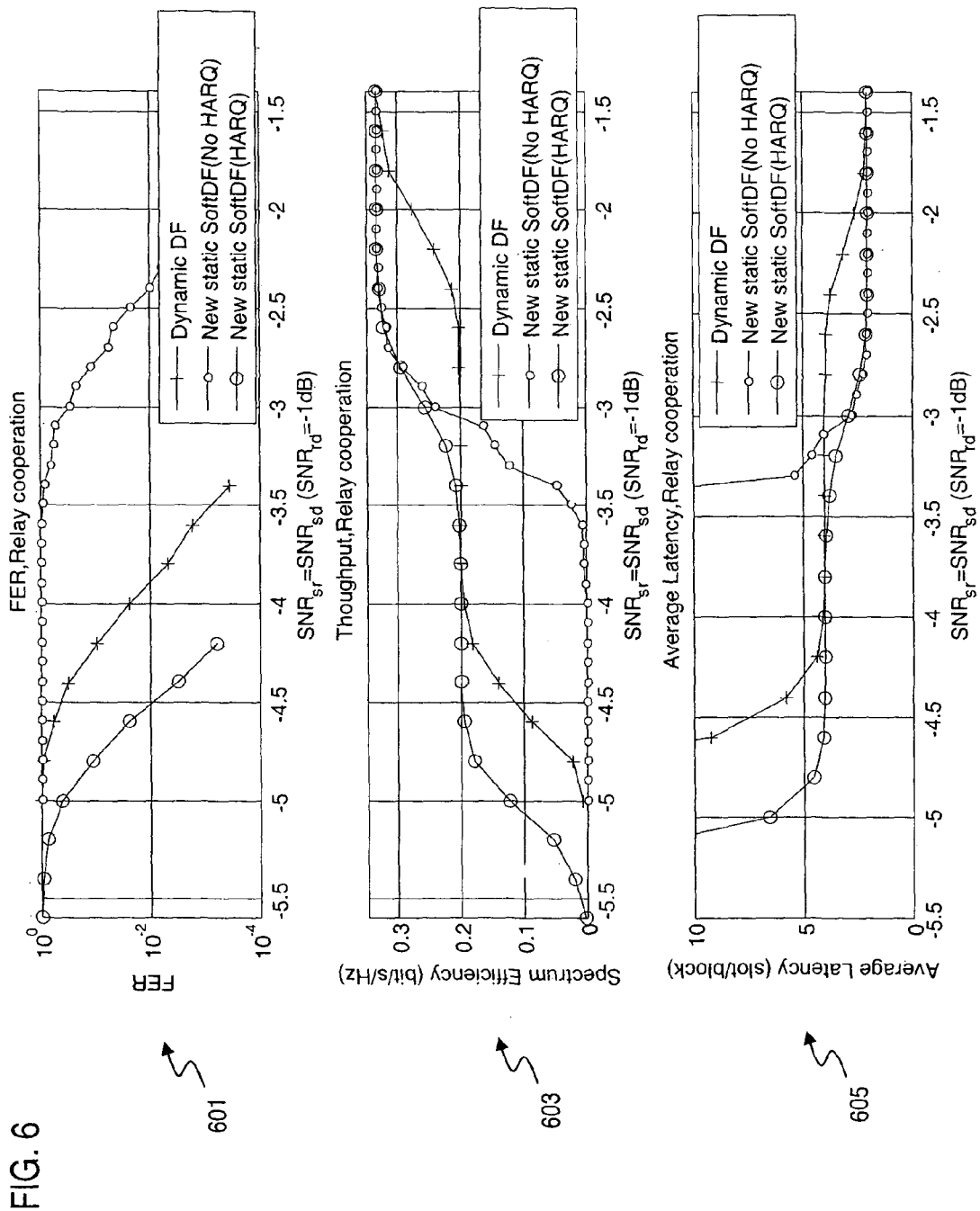
FIG. 6 is a diagram of graphs showing performance comparisons of various relay schemes in which the performance relates to average latency, spectrum efficiency, and frame error rate (FER), in accordance with an embodiment of the invention.

FIG. 6 is a diagram of graphs showing performance comparisons of various relay schemes in which the performance relates to average latency, spectrum efficiency, and forward error rate (FER), in accordance with an embodiment of the invention. The simulation curves of dynamic DF, the proposed static soft DF without and with HARQ are provided. The new static soft DF scheme with HARQ provides the best performance in FER (graph 601), spectrum efficiency (graph 603), and latency delay (graph 605).

Figure 7:
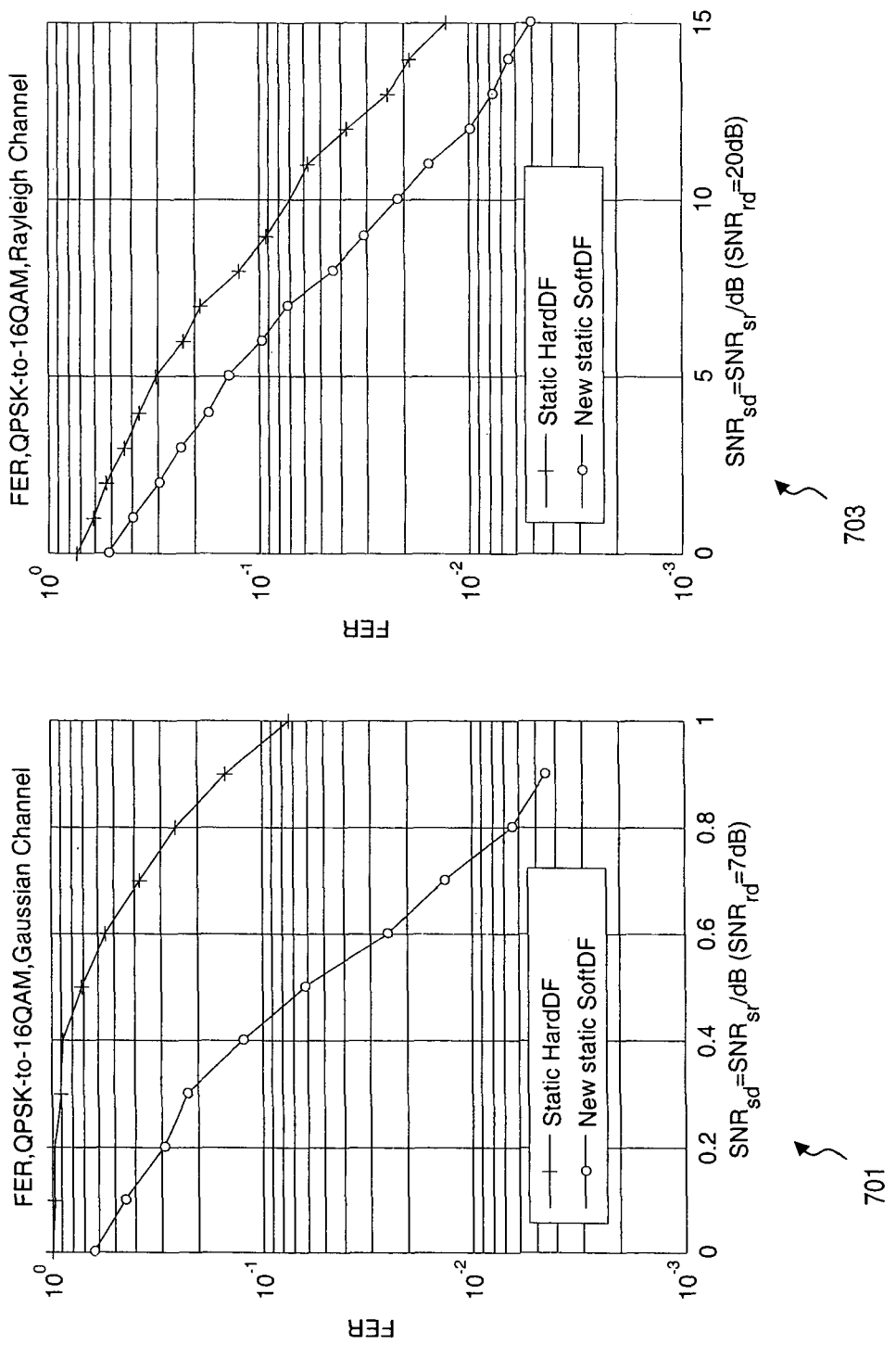
FIG. 7 is a diagram of graphs showing frame error rate (FER) performance comparison of various relay schemes involving quadrature phase shift keying (QPSK) and 16-QAM (quadrature amplitude modulation), in accordance with an embodiment of the invention.

FIG. 7 is a diagram of graphs showing frame error rate (FER) performance comparison of various relay schemes involving quadrature phase shift keying (QPSK) and 16-QAM (quadrature amplitude modulation), in accordance with an embodiment of the invention. The simulation results in the case involves AMC being performed in the relay node 105; specifically, the relay node 105 employs 16QAM instead of QPSK (which is applied in the source node 101, namely because the channel from the relay to destination is good so that system efficiency can be improved). This simulation is without HARQ. Graph 701 is the FER for an AWGN channel, and graph 703 relates to a Rayleigh block fading channel. These graphs 701, 703 reveal that the new soft DF scheme achieves considerably more gain as compared to static Hard DF scheme, in part because the new soft DF scheme addresses error propagation and maintains soft information.

Figure 8:
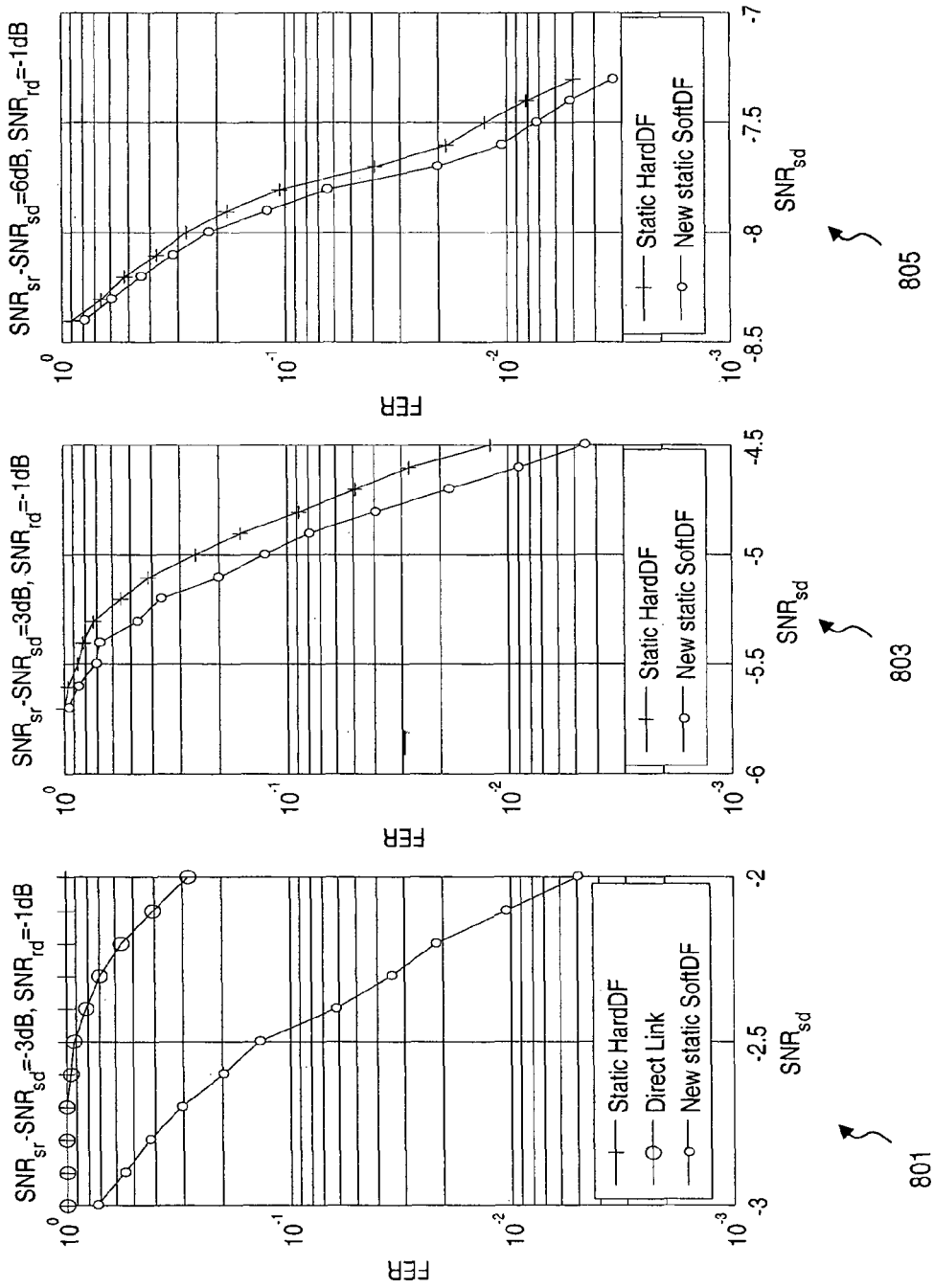
FIG. 8 is a diagram of graphs showing performance comparison of various relay schemes involving different signal-to-noise ratio (SNR) relationships of a link from source to relay (SR) and a link from source to destination (SD), in accordance with an embodiment of the invention.

FIG. 8 is a diagram of graphs showing performance comparison of various relay schemes involving different signal-to-noise ratio (SNR) relationships of a link from source to relay (SR) and a link from source to destination (SD), in accordance with an embodiment of the invention. The simulations of graphs 501-503, 601-605, and 701-703 are all performed in the case in which the SNR in channel SR is the same as that of the channel SD. Thus, graphs 801-805 compare the performance in different relationship of SNR in channel SR and channel SD; the simulation provides no HARQ. From left to right, graphs 801-805 are FER curves in cases that SNR_SR−SNR_SD=−3 dB, SNR_SR−SNR_SD=+3 dB and SNR_SR−SNR_SD=+6 dB, respectively. In these cases, the new soft DF scheme outperforms the static hard DF scheme; it noted that the performance gap is narrowed from as the SNR_SR and SNR_SD differences increase. In particular, from graph 801 the following conclusion can be reached: even if the channel from source to relay is much worse, the relay employing the new soft DF scheme can still provide significant benefit to the destination compared to the case in which only a direct link employed. By contrast, the relay employing static HardDF provides no gain—in fact, may even corrupt the transmission from direct link.

Figure 9:
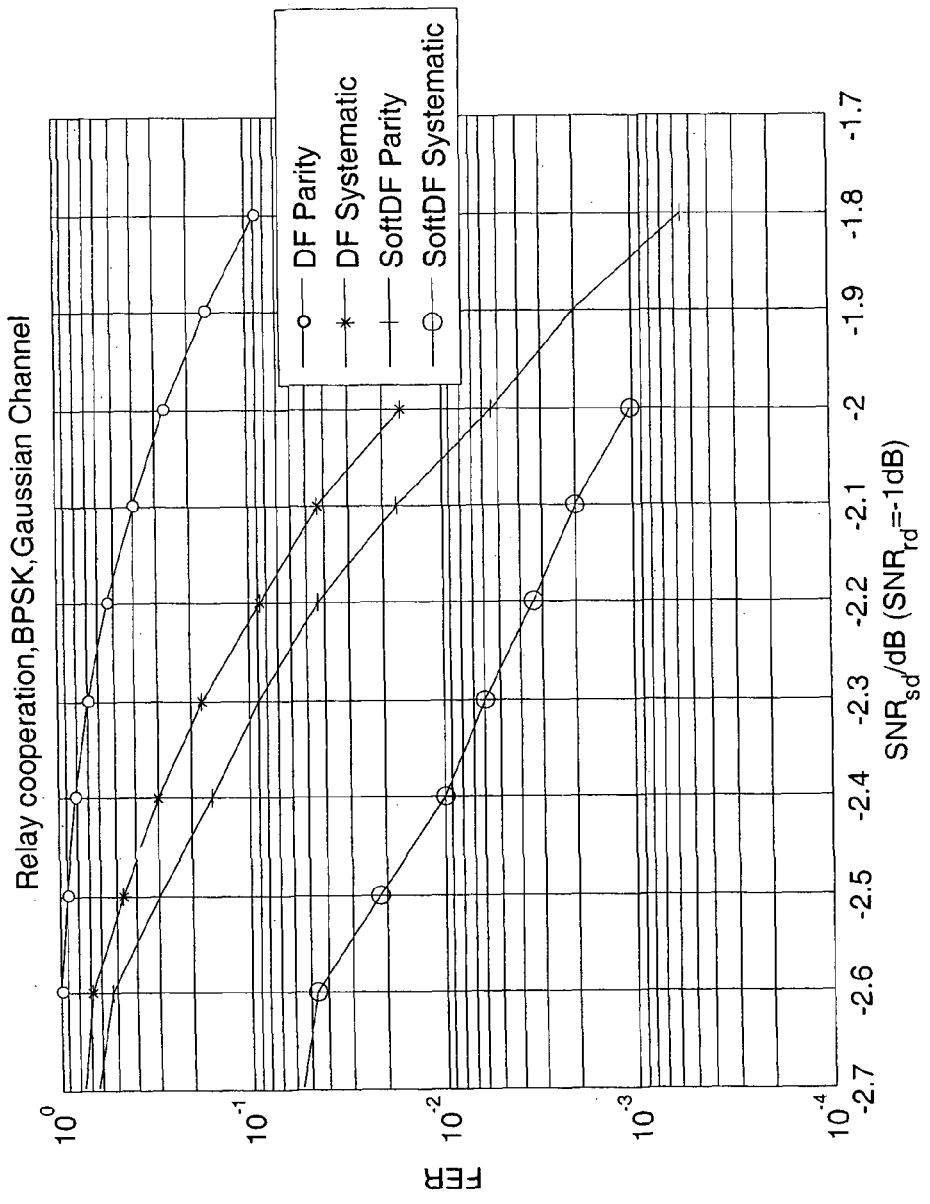
FIG. 9 is a graph showing performance comparison of various relay schemes involving relaying of systematic bits and punctured parity bits, in accordance with an embodiment of the invention.

FIG. 9 is a graph showing performance comparison of various relay schemes involving relaying of systematic bits and punctured parity bits, in accordance with an embodiment of the invention. Graph 901 shows the FER performance of static HardDF and the new static Soft DF scheme in the cases of relay forwarding systematic bits and punctured parity bits. The results suggest that if imperfect decoding occurs in the relay node 105, such decoding prior to forwarding of systematic bits rather than punctured parity bits. This conclusion is contrary to the case in which the relay decodes correctly. The same conclusion also holds true for a non-cooperative relay system.

FIG. 10 is a diagram of graphs showing performance comparison of various relay schemes utilized in a non-cooperative relay system, in accordance with an embodiment of the invention.

Graphs 1001-1011 show the simulation results of the new static SoftDF, static HardDF and dynamic DF scheme in a non-cooperative relay system. Specifically, graphs 1001-1005 pertain to FER, spectrum efficiency, and average latency, respectively, in the case of $SNR_{SR}$ of −4 dB; while graphs 1007-1011 relates to the case of $SNR_{SR}$ of −3 dB. The results indicate that the static Hard DF is not effective if the channel from the source node 101 to the relay node 105 is very poor because of error propagation. The new static SoftDF outperforms dynamic DF in FER, spectrum efficiency and latency delay in any channel conditions.

FIG. 11 is a diagram of graphs showing peak-to-average ratio (PAR) performance comparison of various relay schemes, in accordance with an embodiment of the invention. Graphs 1101 and 1103 show the PAR performance of static HardDF, conventional Soft DF, and the new SoftDF schemes in OFDM system. Graph 1101 is for the OFDM symbol length equals 256, while graph 1103 is for 512. The result shows that the three schemes have nearly the same PAR.

From the simulation curves of the FIGS. 5-11, the following conclusions can be made. The soft symbol estimation scheme outperforms the conventional AF, static HardDF, the hybrid AF/DF, dynamic DF, and the conventional soft re-modulation scheme in FER, spectrum efficiency and latency delay for any modulation pattern no matter whether the channel is AWGN or Rayleigh block fading.

As evident from the discussion, the soft symbol estimation scheme can be used effectively in cooperative and non-cooperative relay systems. In an exemplary embodiment, the soft symbol estimation scheme is applied only in the relay node 105, and is transparent to the source node 101 and the destination node 103. Thus, this approach does not increase operational complexity in the source node 101 or the destination node 103. The increase in complexity within the relay node 105 to provide the soft re-modulation function is found to be negligible. Additionally, the soft symbol estimation scheme can support AMC in both the source node 101 as well as the relay node 105. Consequently, the source node 101 and the relay node 105 can utilize the same or different modulation, as this does not impact use of the soft symbol estimation scheme.

One of ordinary skill in the art would recognize that the processes associated with relaying may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 12.

Figure 12:
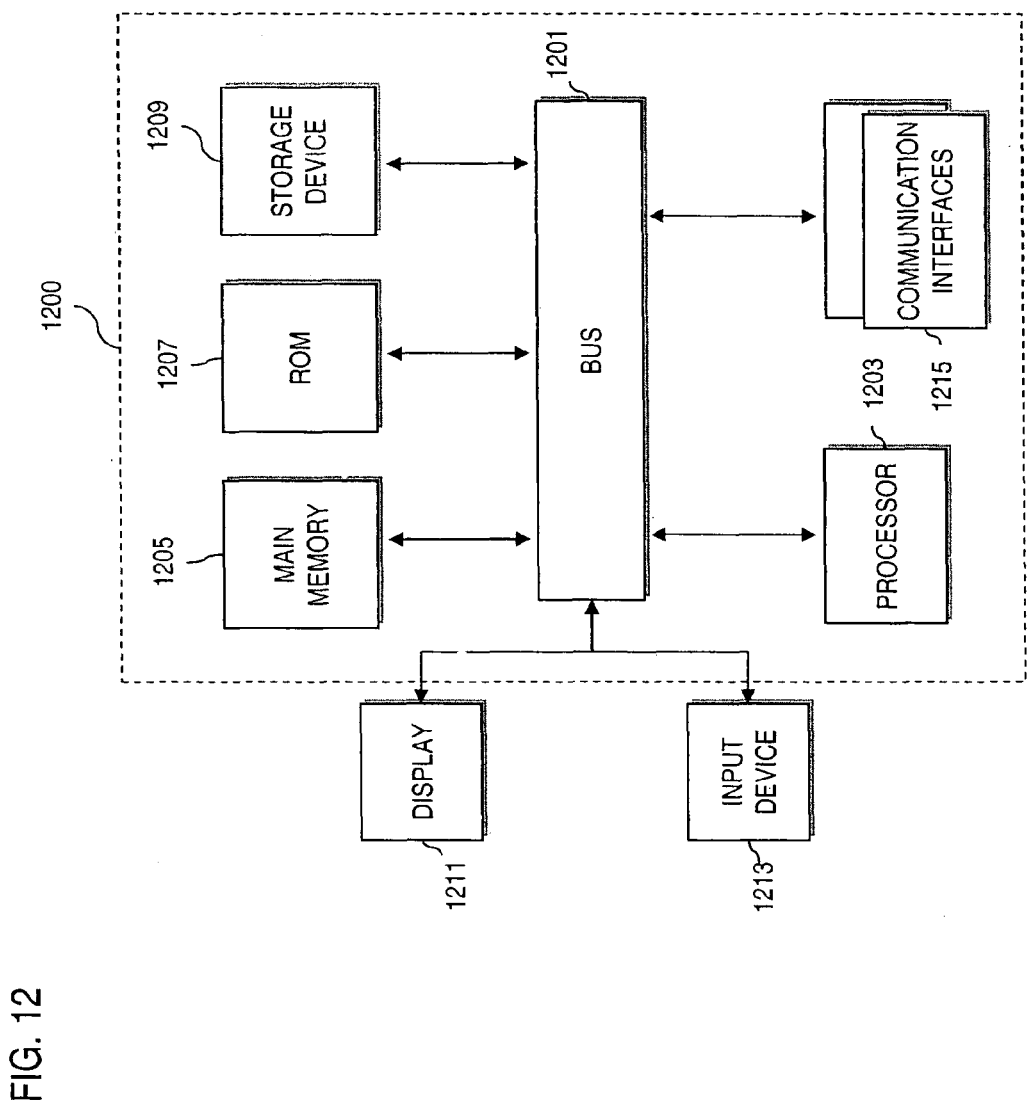
FIG. 12 is a diagram of hardware that can be used to implement an embodiment of the invention.

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 13A-13D are diagrams of communication systems having exemplary long-term evolution (LTE) architectures, in which the system of FIG. 1 can operate, according to various exemplary embodiments of the invention. By way of example (shown in FIG. 13A), a base station (e.g., destination node 103) and a user equipment (UE) (e.g., source node 101) can communicate in system 1300 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 13A:
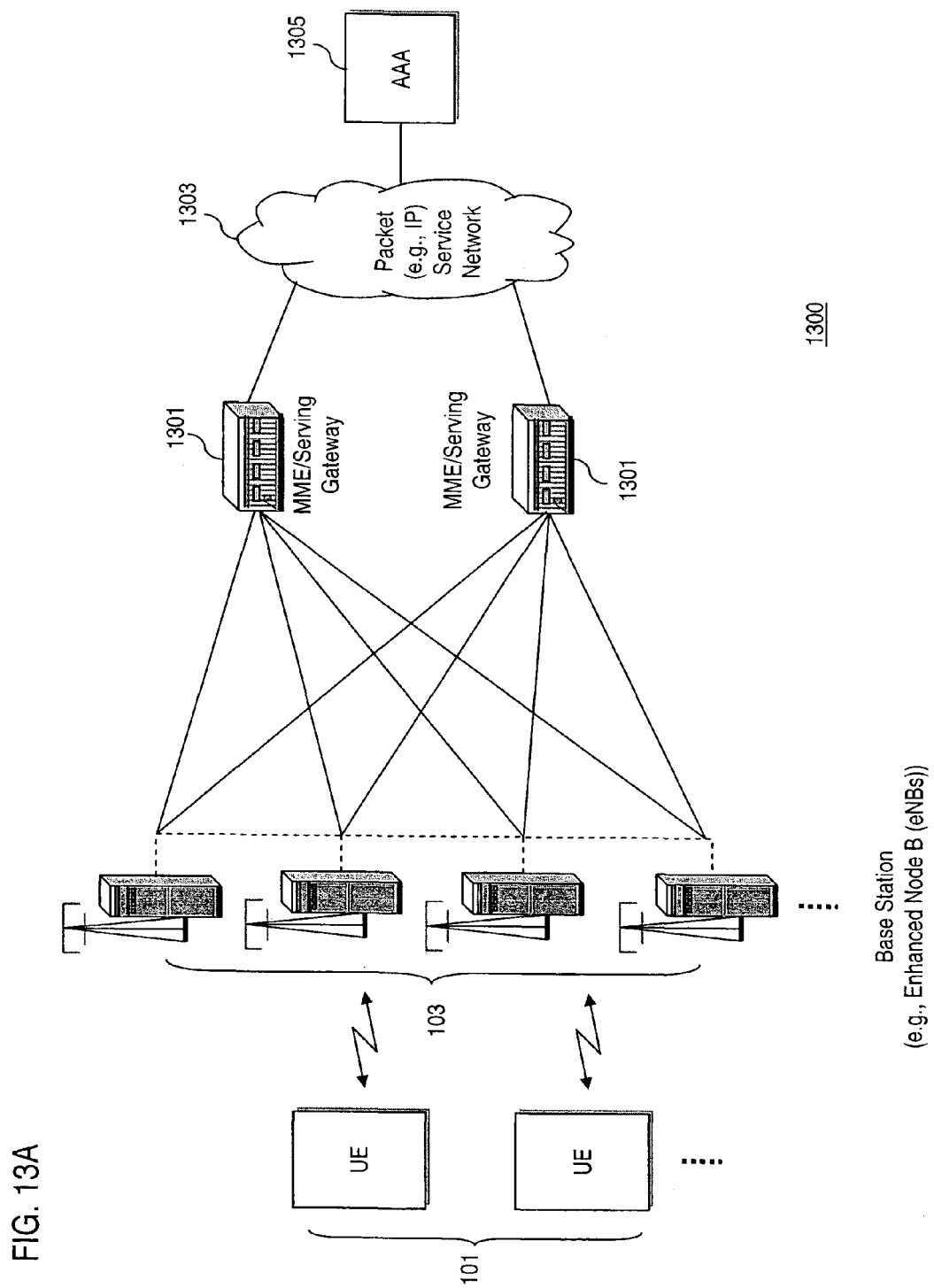
FIGS. 13A-13D are diagrams of communication systems having exemplary long-term evolution (LTE) and E-UTRA (Evolved Universal Terrestrial Radio Access) architectures, in which the system of FIG. 1 can operate, according to various exemplary embodiments of the invention.

The communication system 1300 is compliant with 3GPP LTE, entitled "Long Term Evolution of the 3GPP Radio Technology" (which is incorporated herein by reference in its entirety). As shown in FIG. 13A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 3.9G), etc.). Under the 3GPP LTE architecture, base station 103 is denoted as an enhanced Node B (eNB). The UE 101 can be any type of mobile stations, such as handsets, terminals, stations, units, devices, or any type of interface to the user (such as "wearable" circuitry, etc.).

The MME (Mobile Management Entity)/Serving Gateways 1301 are connected to the eNBs 103 in a full or partial mesh configuration using tunneling over a packet transport network (e.g., Internet Protocol (IP) network) 1303. Exemplary functions of the MME/Serving GW 1301 include distribution of paging messages to the eNBs 103, termination of U-plane packets for paging reasons, and switching of U-plane for support of UE mobility. Since the GWs 1301 serve as a gateway to external networks, e.g., the Internet or private networks 1303, the GWs 1301 include an Access, Authorization and Accounting system (AAA) 1305 to securely determine the identity and privileges of a user and to track each user's activities. Namely, the MME Serving Gateway 1301 is the key control-node for the LTE access-network and is responsible for idle mode UE tracking and paging procedure including retransmissions. Also, the MME 1301 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 13B:
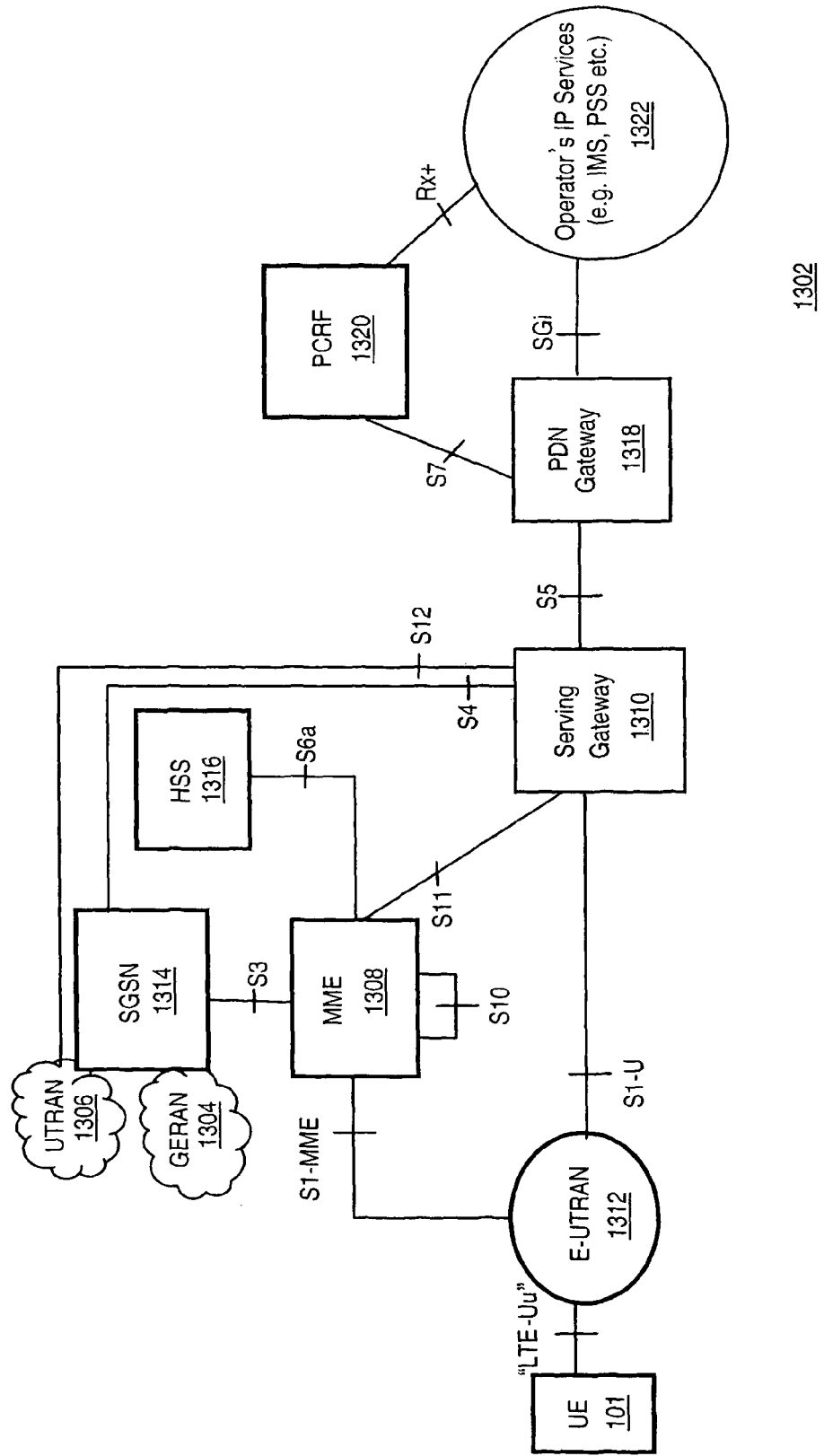

In FIG. 13B, a communication system 1302 supports GERAN (GSM/EDGE radio access) 1304, and UTRAN 1306 based access networks, E-UTRAN 1312 and non-3GPP (not shown) based access networks, and is more fully described in TR 23.882, which is incorporated herein by reference in its entirety. A key feature of this system is the separation of the network entity that performs control-plane functionality (MME 1308) from the network entity that performs bearer-plane functionality (Serving Gateway 1310) with a well defined open interface between them S11. Since E-UTRAN 1312 provides higher bandwidths to enable new services as well as to improve existing ones, separation of MME 1308 from Serving Gateway 1310 implies that Serving Gateway 1310 can be based on a platform optimized for signaling transactions. This scheme enables selection of more cost-effective platforms for, as well as independent scaling of, each of these two elements. Service providers can also select optimized topological locations of Serving Gateways 1310 within the network independent of the locations of MMEs 1308 in order to reduce optimized bandwidth latencies and avoid concentrated points of failure.

The basic architecture of the system 1302 contains following network elements. As seen in FIG. 13B, the E-UTRAN (e.g., eNB) 1312 interfaces with UE 101 via LTE-Uu. The E-UTRAN 1312 supports LTE air interface and includes functions for radio resource control (RRC) functionality corresponding to the control plane MME 1308. The E-UTRAN 1312 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1308, as a key control node, is responsible for managing mobility UE identifies and security parameters and paging procedure including retransmissions. The MME 1308 is involved in the bearer activation/deactivation process and is also responsible for choosing Serving Gateway 1310 for the UE 101. MME 1308 functions include Non Access Stratum (NAS) signaling and related security. MME 1308 checks the authorization of the UE 101 to camp on the service provider's Public Land Mobile Network (PLMN) and enforces UE 101 roaming restrictions. The MME 1308 also provides the control plane function for mobility between LTE and 2G/3G access networks with the S3 interface terminating at the MME 1308 from the SGSN (Serving GPRS Support Node) 1314.

The SGSN 1314 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1308 and HSS (Home Subscriber Server) 1316. The S10 interface between MMEs 1308 provides MME relocation and MME 1308 to MME 1308 information transfer. The Serving Gateway 1310 is the node that terminates the interface towards the E-UTRAN 1312 via S1-U.

The S1-U interface provides a per bearer user plane tunneling between the E-UTRAN 1312 and Serving Gateway 1310. It contains support for path switching during handover between eNBs 103. The S4 interface provides the user plane with related control and mobility support between SGSN 1314 and the 3GPP Anchor function of Serving Gateway 1310.

The S12 is an interface between UTRAN 1306 and Serving Gateway 1310. Packet Data Network (PDN) Gateway 1318 provides connectivity to the UE 101 to external packet data networks by being the point of exit and entry of traffic for the UE 101. The PDN Gateway 1318 performs policy enforcement, packet filtering for each user, charging support, lawful interception and packet screening. Another role of the PDN Gateway 1318 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 1320 to Policy and Charging Enforcement Function (PCEF) in the PDN Gateway 1318. The SGi interface is the interface between the PDN Gateway and the operator's IP services including packet data network 1322. Packet data network 1322 may be an operator external public or private packet data network or an intra operator packet data network, e.g., for provision of IMS (IP Multimedia Subsystem) services. Rx+ is the interface between the PCRF and the packet data network 1322.

Figure 13C:
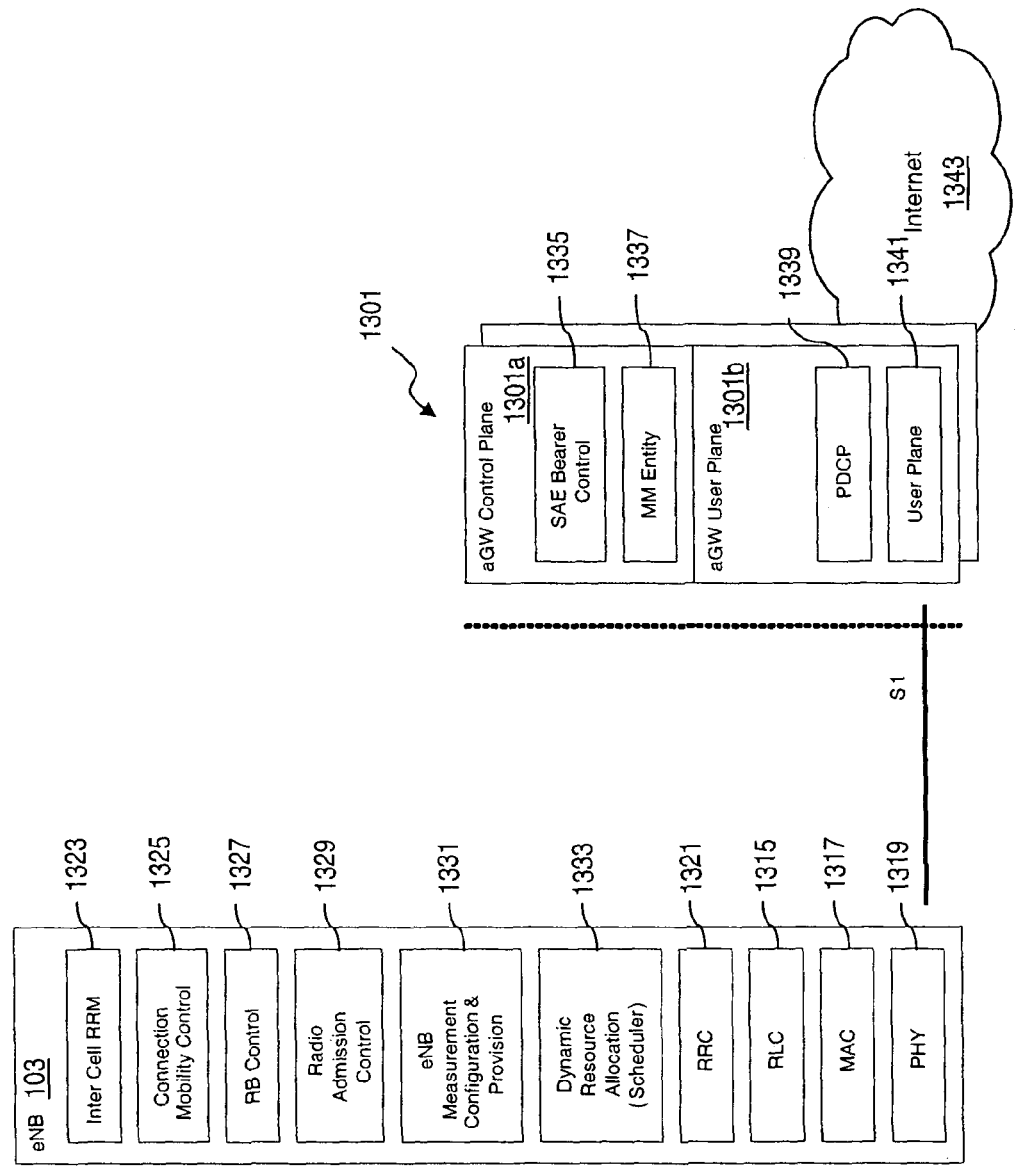

As seen in FIG. 13C, the eNB 103 utilizes an E-UTRA (Evolved Universal Terrestrial Radio Access) (user plane, e.g., RLC (Radio Link Control) 1315, MAC (Media Access Control) 1317, and PHY (Physical) 1319, as well as a control plane (e.g., RRC 1321)). The eNB 103 also includes the following functions: Inter Cell RRM (Radio Resource Management) 1323, Connection Mobility Control 1325, RB (Radio Bearer) Control 1327, Radio Admission Control 1329, eNB Measurement Configuration and Provision 1331, and Dynamic Resource Allocation (Scheduler) 1333.

The eNB 103 communicates with the aGW 1301 (Access Gateway) via an S1 interface. The aGW 1301 includes a User Plane 1301a and a Control plane 1301b. The control plane 1301b provides the following components: SAE (System Architecture Evolution) Bearer Control 1335 and MM (Mobile Management) Entity 1337. The user plane 1301b includes a PDCP (Packet Data Convergence Protocol) 1339 and a user plane functions 1341. It is noted that the functionality of the aGW 1301 can also be provided by a combination of a serving gateway (SGW) and a packet data network (PDN) GW. The aGW 1301 can also interface with a packet network, such as the Internet 1343.

Figure 13D:
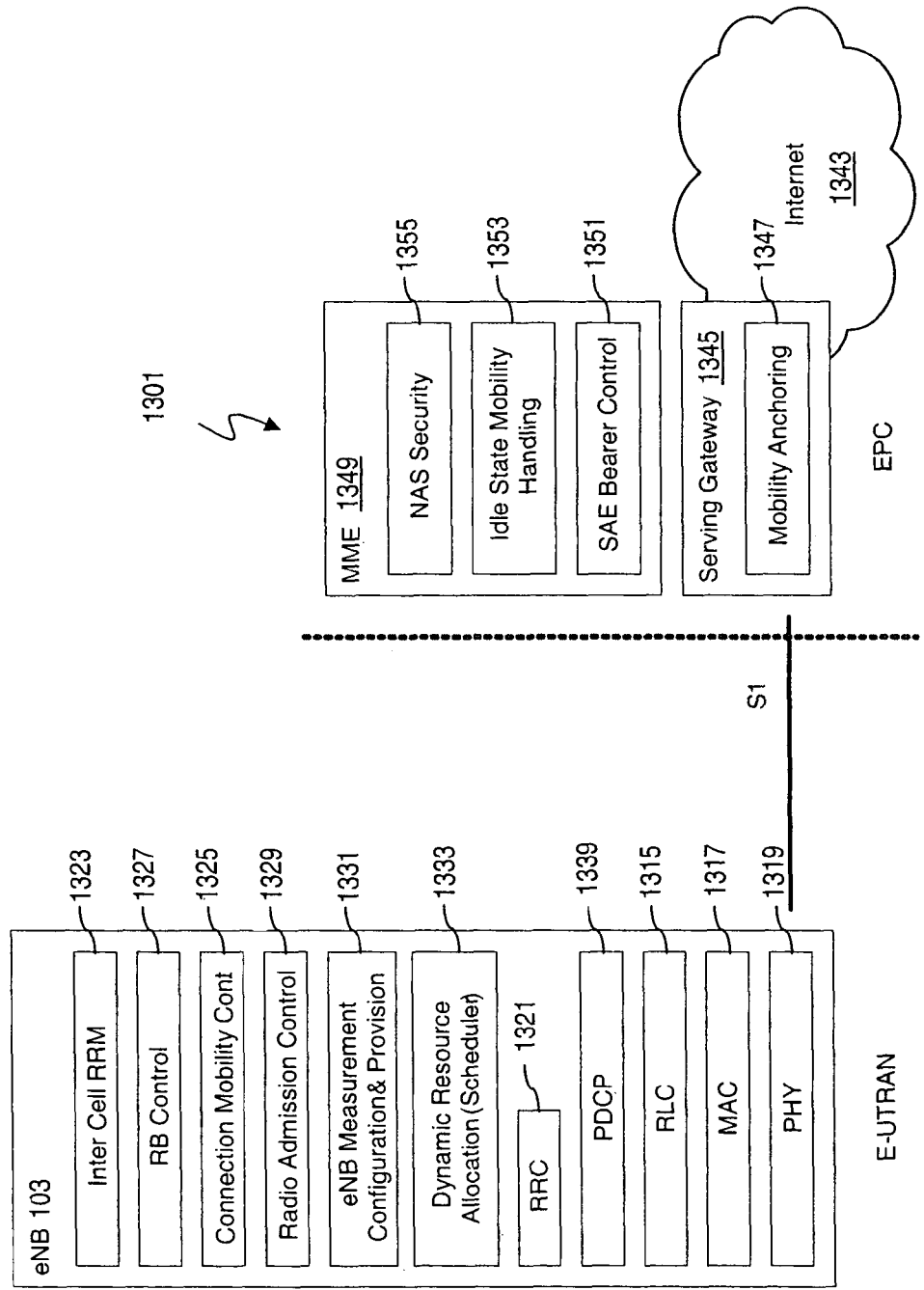

In an alternative embodiment, as shown in FIG. 13D, the PDCP (Packet Data Convergence Protocol) functionality can reside in the eNB 103 rather than the GW 1301. Other than this PDCP capability, the eNB functions of FIG. 13C are also provided in this architecture.

In the system of FIG. 13D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S1 to the Serving Gateway 1345, which includes a Mobility Anchoring function 1347. According to this architecture, the MME (Mobility Management Entity) 1349 provides SAE (System Architecture Evolution) Bearer Control 1351, Idle State Mobility Handling 1353, and NAS (Non-Access Stratum) Security 1355.

Figure 14:
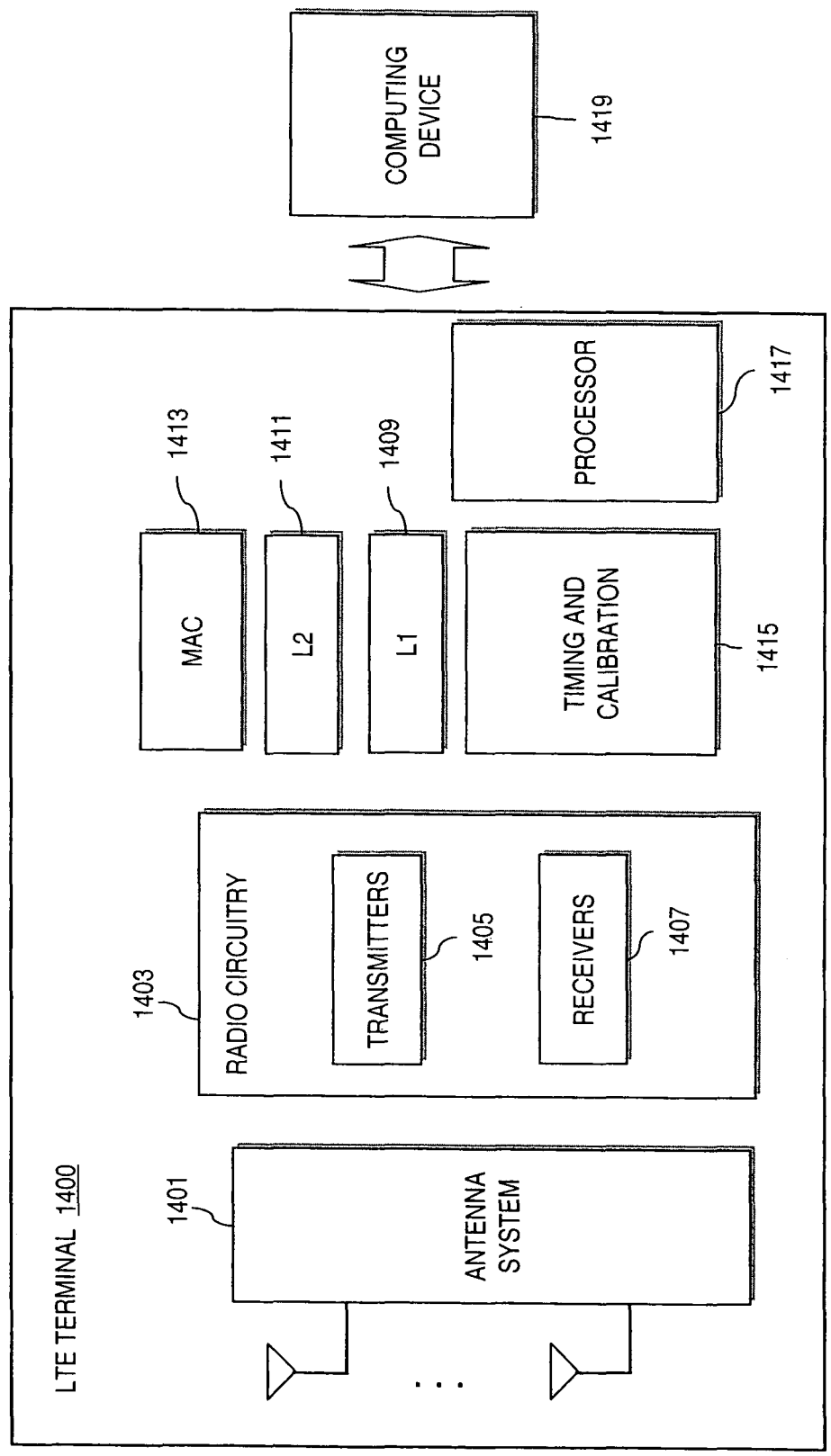
FIG. 14 is a diagram of exemplary components of an LTE terminal capable of operating in the systems of FIGS. 13A-13D, according to an embodiment of the invention.

FIG. 14 is a diagram of exemplary components of an LTE terminal capable of operating in the systems of FIGS. 13A-13D, according to an embodiment of the invention. An LTE terminal 1400 is configured to operate in a Multiple Input Multiple Output (MIMO) system. Consequently, an antenna system 1401 provides for multiple antennas to receive and transmit signals. The antenna system 1401 is coupled to radio circuitry 1403, which includes multiple transmitters 1405 and receivers 1407. The radio circuitry encompasses all of the Radio Frequency (RF) circuitry as well as base-band processing circuitry. As shown, layer-1 (L1) and layer-2 (L2) processing are provided by units 1409 and 1411, respectively. Optionally, layer-3 functions can be provided (not shown). Module 1413 executes all MAC layer functions. A timing and calibration module 1415 maintains proper timing by interfacing, for example, an external timing reference (not shown). Additionally, a processor 1417 is included. Under this scenario, the LTE terminal 1400 communicates with a computing device 1419, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a signal over a communication link;
demodulating the signal;
computing a cyclic redundancy check for the received signal;
estimating soft symbols based on probability information corresponding to the demodulated signal;
remodulating the demodulated signal based on the soft symbols; and
outputting a relay signal based on the remodulated signal,
wherein, if the cyclic redundancy check is incorrect, the estimation of the soft symbols is performed,
wherein the received signal includes systematic bits and parity bits,
wherein the parity bits are forwarded in advance of the systematic bits if the cyclic redundancy check is correct,
wherein the systematic bits are forwarded in advance of the parity bits if the cyclic redundancy check is incorrect.

2. A method according to claim 1, further comprising:
decoding the demodulated signal, wherein the soft symbols are estimated using probability information corresponding to the decoded signal; and
forwarding the relay signal irrespective of whether the decoding is correct.

3. A method according to claim 1, wherein the signal is originated from a source node, the relay signal being transmitted to a destination node that is configured to combine the relay signal with the signal from the source node.

4. An apparatus comprising:
a demodulator configured to demodulate a signal received over a communication link;
logic configured to compute a cyclic redundancy check for the received signal;
a soft symbol estimator configured to estimate soft symbols based on probability information corresponding to the demodulated signal; and
a re-modulator configured to remodulate the demodulated signal based on the soft symbols as a relay signal,
wherein, if the cyclic redundancy check is incorrect, the estimation of the soft symbols is performed,
wherein the received signal includes systematic bits and parity bits,
wherein the parity bits are forwarded in advance of the systematic bits if the cyclic redundancy check is correct,
wherein the systematic bits are forwarded in advance of the parity bits if the cyclic redundancy check is incorrect.

5. An apparatus according to claim 4, further comprising:
a decoder configured to decode the demodulated signal, wherein the soft symbols are estimated using probability information corresponding to the decoded signal; and
a transceiver configured to forward the relay signal irrespective of whether the decoding is correct.

6. An apparatus according to claim 4, wherein the signal is originated from a source node, the relay signal being transmitted to a destination node that is configured to combine the relay signal with the signal from the source node.

7. An apparatus according to claim 6, wherein the signals are combined by the destination node either at a symbol level if identical modulation schemes are applied to the signals, or at a bit level if different modulation schemes are applied to the signals.

8. An apparatus according to claim 4, wherein the signal is originated from a source node, and the relay signal is transmitted to a destination node that does not receive the signal directly from the source node.

9. An apparatus according to claim 4, further comprising:
an equalizer configured to perform channel equalization on the received signal using channel coefficients of the communication link.

10. An apparatus according to claim 4, further comprising:
logic configured to compare the probability information with a threshold before performing soft symbol estimation, wherein values, associated with the probability information, that are larger than the threshold are set as the value of the threshold to reduce peak-to-mean ratio value.

11. An apparatus according to claim 4, wherein the probability information includes a posteriori probability from at least one of a demodulator, a decoder, or a re-encoder.

12. An apparatus according to claim 4, wherein the communication link is established over network that is compliant with a long term evolution (LTE) architecture.

13. A system comprising:
a relay node configured to receive a signal over a communication link, to compute a cyclic redundancy check for the received signal, to demodulate the signal, and to estimate soft symbols based on probability information corresponding to the demodulated signal, wherein the relay node is further configured to remodulate the demodulated signal based on the soft symbols as a relay signal, wherein, if the cyclic redundancy check is incorrect, the estimation of the soft symbols is performed, wherein the received signal includes systematic bits and parity bits, wherein the parity bits are forwarded in advance of the systematic bits if the cyclic redundancy check is correct, wherein the systematic bits are forwarded in advance of the parity bits if the cyclic redundancy check is incorrect.

14. A system according to claim 13, wherein the relay node is further configured to decode the demodulated signal, wherein the soft symbols are estimated using probability information corresponding to the decoded signal, the relay node being further configured to forward the relay signal irrespective of whether the decoding is correct.

15. A system according to claim 13, wherein the signal is originated from a source node, the relay signal being transmitted to a destination node that is configured to combine the relay signal with the signal from the source node.

16. A system according to claim 13, wherein the signals are combined by the destination node either at a symbol level if identical modulation schemes are applied to the signals, or at a bit level if different modulation schemes are applied to the signals.

17. A system according to claim 13, wherein the signal is originated from a source node, and the relay signal is transmitted to a destination node that does not receive the signal directly from the source node.

18. A system according to claim 13, wherein the relay node is further configured to obtain channel coefficients of the communication link, and to perform channel equalization on the received signal using the channel coefficients.

* * * * *